(12) United States Patent
Wang et al.

(10) Patent No.: US 11,876,724 B2
(45) Date of Patent: Jan. 16, 2024

(54) FLOW CHARACTERISTIC EXTRACTION METHOD AND APPARATUS

(71) Applicant: HUAWEI TECHNOLOGIES CO., LTD., Guangdong (CN)

(72) Inventors: Zhen Wang, Beijing (CN); Wenbin Yang, Beijing (CN); Yu Bai, Beijing (CN); Guang Li, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 17/897,496

(22) Filed: Aug. 29, 2022

(65) Prior Publication Data

US 2023/0081344 A1     Mar. 16, 2023

(30) Foreign Application Priority Data

Aug. 30, 2021 (CN) .......................... 202111006394.8

(51) Int. Cl.
*H04L 47/41* (2022.01)
*H04L 47/33* (2022.01)

(52) U.S. Cl.
CPC .............. *H04L 47/41* (2013.01); *H04L 47/33* (2013.01)

(58) Field of Classification Search
CPC ......... H04L 47/41; H04L 47/33; H04L 47/10; H04L 47/2441
See application file for complete search history.

(56) References Cited

U.S. PATENT DOCUMENTS

| | | | |
|---|---|---|---|
| 6,256,486 B1* | 7/2001 | Barany | H04B 1/1027 455/296 |
| 10,084,712 B1* | 9/2018 | Li | H04L 43/026 |
| 2008/0008092 A1* | 1/2008 | Wang | H04L 47/263 370/235 |
| 2009/0198845 A1* | 8/2009 | Kim | H04L 47/50 710/40 |
| 2011/0004936 A1* | 1/2011 | Lee | H04L 63/1441 726/24 |
| 2015/0071072 A1* | 3/2015 | Ratzin | G06F 9/544 370/235 |
| 2018/0132138 A1* | 5/2018 | Senarath | H04L 41/0813 |
| 2022/0060963 A1* | 2/2022 | Szász | H04W 40/12 |
| 2022/0166691 A1* | 5/2022 | Johnson | H04L 43/0894 |

\* cited by examiner

*Primary Examiner* — El Hadji M Sall

(57) ABSTRACT

The technology of this application relates to a flow characteristic extraction method and apparatus, and belongs to the field of network technologies. The method includes a network device that determines a burst parameter of a burst traffic segment of a received first packet flow, and determines a burst parameter of the first packet flow based on the burst parameter of the burst traffic segment of the first packet flow. The first packet flow is an elephant flow, the burst traffic segment indicates a burst degree of traffic within one period of time, the burst parameter of the burst traffic segment is a parameter used to describe the burst traffic segment, and the burst parameter of the first packet flow is a parameter used to describe at least one burst traffic segment included in the first packet flow.

20 Claims, 9 Drawing Sheets

FLOW CHARACTERISTIC EXTRACTION METHOD AND APPARATUS

CROSS-REFERENCE TO RELATED APPLICATIONS

This application claims priority to Chinese Patent Application No. 202111006394.8, filed on Aug. 30, 2021, which is incorporated herein by reference in its entirety.

TECHNICAL FIELD

This application relates to the field of network technologies, and in particular, to a flow characteristic extraction method and apparatus.

BACKGROUND

In a process of forwarding a packet flow, a network device may extract a flow characteristic of the packet flow.

With development of network technologies, network traffic continuously increases, and services carried on the network are increasingly enriched. To reduce processing overheads of a protocol stack and load of a central processing unit (CPU), a transmit end of a packet flow usually periodically sends a large quantity of packets. Consequently, this causes a traffic burst (burst).

How to perform flow characteristic extraction on a packet flow that includes burst traffic is a problem that urgently needs to be resolved.

SUMMARY

This application provides a flow characteristic extraction method and apparatus. The technical solutions in this application are as follows.

According to a first aspect, a flow characteristic extraction method is provided, and applied to a network device. The method includes: receiving a first packet flow, where the first packet flow is an elephant flow; determining a burst parameter of a burst traffic segment of the first packet flow, where the burst traffic segment indicates a burst degree of traffic within one period of time, and the burst parameter of the burst traffic segment is a parameter used to describe the burst traffic segment; and determining a burst parameter of the first packet flow based on the burst parameter of the burst traffic segment of the first packet flow, where the burst parameter of the first packet flow is a parameter used to describe at least one burst traffic segment included in the first packet flow. The burst traffic segment includes a plurality of consecutive packets, the burst parameter of the burst traffic segment may represent a flow characteristic of the burst traffic segment, and the burst parameter of the first packet flow may represent a flow characteristic of the first packet flow.

According to the technical solutions provided in this application, the network device determines the burst parameter of the burst traffic segment of the first packet flow, and determines the burst parameter of the first packet flow based on the burst parameter of the burst traffic segment of the first packet flow. Because the first packet flow is an elephant flow, the burst parameter of the first packet flow may represent the flow characteristic of the first packet flow. Therefore, in this application, the flow characteristic of the first packet flow is extracted, that is, a flow characteristic of a packet flow that includes burst traffic is extracted.

Optionally, the first packet flow includes aggregated burst traffic segments of n burst levels. The aggregated burst traffic segments are determined based on burst traffic segments of the first packet flow, for example, an aggregated burst traffic segment is obtained by aggregating the burst traffic segments of the first packet flow, and n is a positive integer. The burst parameter of the first packet flow includes at least one of the following: a quantity of burst levels of the first packet flow and a burst parameter of an aggregated burst traffic segment of each burst level of the first packet flow. The burst parameter of the aggregated burst traffic segment is a parameter used to describe the aggregated burst traffic segment. The burst parameter of the aggregated burst traffic segment is used to represent a flow characteristic of the aggregated burst traffic segment.

According to the technical solutions provided in this application, the burst parameter of the first packet flow includes at least one of the quantity of burst levels of the first packet flow and the burst parameter of the aggregated burst traffic segment of each burst level of the first packet flow. The burst parameter of the aggregated burst traffic segment is used to represent the flow characteristic of the aggregated burst traffic segment. Therefore, both the quantity of burst levels of the first packet flow and the burst parameter of the aggregated burst traffic segment of each burst level of the first packet flow can represent the flow characteristic of the first packet flow.

Optionally, the burst parameter of the aggregated burst traffic segment of each burst level includes at least one of the following: a data volume of the aggregated burst traffic segment of the burst level, duration of the aggregated burst traffic segment of the burst level, a rate of the aggregated burst traffic segment of the burst level, and a time interval between adjacent aggregated burst traffic segments of the burst level. The data volume of the aggregated burst traffic segment is a total quantity of bytes of the aggregated burst traffic segment.

Optionally, a burst parameter of each burst traffic segment includes at least one of the following: a data volume of the burst traffic segment, duration of the burst traffic segment, and a time interval between the burst traffic segment and a burst traffic segment adjacent to the burst traffic segment. The burst traffic segment includes a plurality of consecutive packets. The data volume of the burst traffic segment is a total quantity of bytes of the burst traffic segment, that is, a sum of bytes of the plurality of packets included in the burst traffic segment.

Optionally, the determining a burst parameter of a burst traffic segment of the first packet flow includes: determining the at least one burst traffic segment of the first packet flow based on a packet in the first packet flow; and determining the burst parameter of the burst traffic segment based on a packet in each burst traffic segment. For example, the at least one burst traffic segment of the first packet flow is determined based on a time interval between packets in the first packet flow. The data volume of the burst traffic segment is determined based on a packet in each burst traffic segment. The duration of the burst traffic segment is determined based on a time stamp at which the network device receives the $1^{st}$ packet in each burst traffic segment and a time stamp at which the network device receives the last packet in the burst traffic segment. The time interval between the burst traffic segment and a burst traffic segment adjacent to the burst traffic segment is determined based on a time stamp at which the network device receives the last packet in each burst traffic segment and a time stamp at which the network device receives the 1$^{st}$ packet in a burst traffic segment next to the burst traffic segment.

Optionally, the first packet flow includes a plurality of burst traffic segments, and the determining a burst parameter of the first packet flow based on the burst parameter of the burst traffic segment of the first packet flow includes: determining burst parameter distribution of the plurality of burst traffic segments based on burst parameters of the plurality of burst traffic segments; and determining the burst parameter of the first packet flow based on the burst parameter distribution.

Optionally, the burst parameter of each burst traffic segment includes at least one of the data volume of the burst traffic segment, the duration of the burst traffic segment, and the time interval corresponding to the burst traffic segment. The time interval corresponding to the burst traffic segment is the time interval between the burst traffic segment and a burst traffic segment adjacent to the burst traffic segment. The burst parameter distribution includes at least one of data volume distribution, duration distribution, and time interval distribution. The data volume distribution includes a plurality of data volumes and a quantity of burst traffic segments of each of the plurality of data volumes. The duration distribution includes the plurality of data volumes and total duration of burst traffic segments of each of the plurality of data volumes. The time interval distribution includes a plurality of time intervals and a quantity of burst traffic segments corresponding to each of the plurality of time intervals. The plurality of data volumes are determined based on data volumes of the plurality of burst traffic segments. The plurality of time intervals are determined based on time intervals corresponding to the plurality of burst traffic segments.

Optionally, the first packet flow includes the aggregated burst traffic segments of n burst levels, where n is an integer greater than 1. In ascending order of burst levels, data volumes of the aggregated burst traffic segments of n burst levels increase sequentially, and time intervals between adjacent aggregated burst traffic segments of n burst levels increase sequentially. The determining the burst parameter of the first packet flow based on the burst parameter distribution includes at least one of the following steps (1) to (5):

(1) determining a first data volume in the data volume distribution as a data volume of an aggregated burst traffic segment of the 1$^{st}$ burst level, where the 1$^{st}$ burst level is a lowest burst level in the n burst levels, and the first data volume is a data volume corresponding to a largest quantity of burst traffic segments in the data volume distribution;

(2) determining n interval levels based on the time interval distribution, where each interval level includes at least one time interval, quantities of burst traffic segments corresponding to time intervals in the interval level increase sequentially from a boundary of the interval level to a center of the interval level, and time intervals in the n interval levels increase sequentially; and determining a time interval between adjacent aggregated burst traffic segments of a k$^{th}$ burst level based on a time interval in a k$^{th}$ interval level of the n interval levels, where 1≤k≤n, and k is an integer;

(3) determining a data volume of an aggregated burst traffic segment of an i$^{th}$ burst level based on a total quantity of burst traffic segments in the time interval distribution, a total quantity of burst traffic segments corresponding to a time interval of an it interval level of the n interval levels, and the data volume of the aggregated burst traffic segment of the 1$^{st}$ burst level, where 1<i≤n, and i is an integer;

(4) determining duration of an aggregated burst traffic segment of the k$^{th}$ burst level based on total duration corresponding to a data volume of the aggregated burst traffic segment of the k$^{th}$ burst level in the duration distribution and a quantity of burst traffic segments corresponding to the data volume of the aggregated burst traffic segment of the k$^{th}$ burst level in the data volume distribution; and (5) determining a rate of the aggregated burst traffic segment of the k$^{th}$ burst level based on the data volume of the aggregated burst traffic segment of the k$^{th}$ burst level and the duration of the aggregated burst traffic segment of the k$^{th}$ burst level.

Optionally, the method further includes outputting a histogram of the burst parameter distribution. The network device outputs the histogram of the burst parameter distribution, so that the burst parameter distribution can be displayed in a visualized manner.

Optionally, the method further includes: determining a service type of the first packet flow based on the burst parameter of the first packet flow. For example, the service type of the first packet flow is an interactive service or a non-real-time interactive service.

Optionally, the method further includes: determining a service-level agreement (SLA) requirement level of the first packet flow based on the burst parameter of the first packet flow. The SLA requirement level may include a delay requirement level, a packet loss requirement level, and the like. The network device determines the SLA requirement level of the first packet flow, so that a forwarding policy of the first packet flow may be determined based on the SLA requirement level of the first packet flow, to forward the first packet flow.

Optionally, the method further includes: determining an arrival model of the first packet flow based on the burst parameter of the first packet flow, where the arrival model is represented by at least one of a transmission delay and a packet loss rate of the first packet flow.

Optionally, the method further includes: detecting attack traffic based on the burst parameter of the first packet flow.

According to a second aspect, a flow characteristic extraction apparatus is provided. The apparatus includes each module configured to perform the flow characteristic extraction method provided in any one of the first aspect or the optional manners of the first aspect. The module may be implemented based on software, hardware, or a combination of software and hardware, and the module may be randomly combined or divided based on specific implementation.

According to a third aspect, a flow characteristic extraction apparatus is provided. The apparatus includes a memory and a processor.

The memory is configured to store a computer program.

The processor is configured to execute the computer program stored in the memory, to enable the flow characteristic extraction apparatus to perform the flow characteristic extraction method provided in any one of the first aspect or the optional manners of the first aspect.

Optionally, the flow characteristic extraction apparatus provided in the second aspect and the third aspect may be a network device, or may be a functional component in the network device, for example, a chip in the network device.

According to a fourth aspect, a computer-readable storage medium is provided. The computer-readable storage medium stores a computer program. When the computer program is executed, the flow characteristic extraction method provided in any one of the first aspect or the optional manners of the first aspect is implemented.

According to a fifth aspect, a computer program product is provided. The computer program product includes a program or code. When the program or the code is executed, the flow characteristic extraction method provided in any one of the first aspect or the optional manners of the first aspect is implemented.

According to a sixth aspect, a chip is provided. The chip includes a programmable logic circuit and/or program instructions. When the chip runs, the chip is configured to implement the flow characteristic extraction method provided in any one of the first aspect or the optional manners of the first aspect.

Optionally, the chip is a control chip or a forwarding chip.

The technical solutions provided in this application bring the following beneficial effects.

According to the flow characteristic extraction method and apparatus provided in this application, a network device determines a burst parameter of a burst traffic segment of a received first packet flow, and determines a burst parameter of the first packet flow based on the burst parameter of the burst traffic segment of the first packet flow. The first packet flow is an elephant flow. The burst traffic segment indicates a burst degree of traffic within one period of time. The burst parameter of the burst traffic segment is a parameter used to describe the burst traffic segment. The burst parameter of the first packet flow is a parameter used to describe at least one burst traffic segment included in the first packet flow. The burst parameter of the first packet flow may represent a flow characteristic of the first packet flow. Therefore, in this application, the flow characteristic of the first packet flow is extracted, that is, a flow characteristic of a packet flow that includes burst traffic is extracted.

In this application, that a network device determines a burst parameter of a first packet flow (that is, extracting a flow characteristic of the first packet flow) has a broad application prospect. For example, the network device may determine a service type of the first packet flow, determine an SLA requirement level of the first packet flow, determine an arrival model of the first packet flow, detect attack traffic, and the like based on the burst parameter of the first packet flow. In addition, after determining the SLA requirement level of the first packet flow, the network device may further forward the first packet flow based on the SLA requirement level of the first packet flow, so that the network device may forward different packet flows based on SLA requirement levels of different packet flows. This helps ensure an SLA requirement of a high-value service. After determining the arrival model of the first packet flow, the network device may further quantitatively evaluate, based on the arrival model of the first packet flow, impact of the first packet flow on a buffer (buffer) of the network device and network stability.

DESCRIPTION OF EMBODIMENTS

Figure 1:
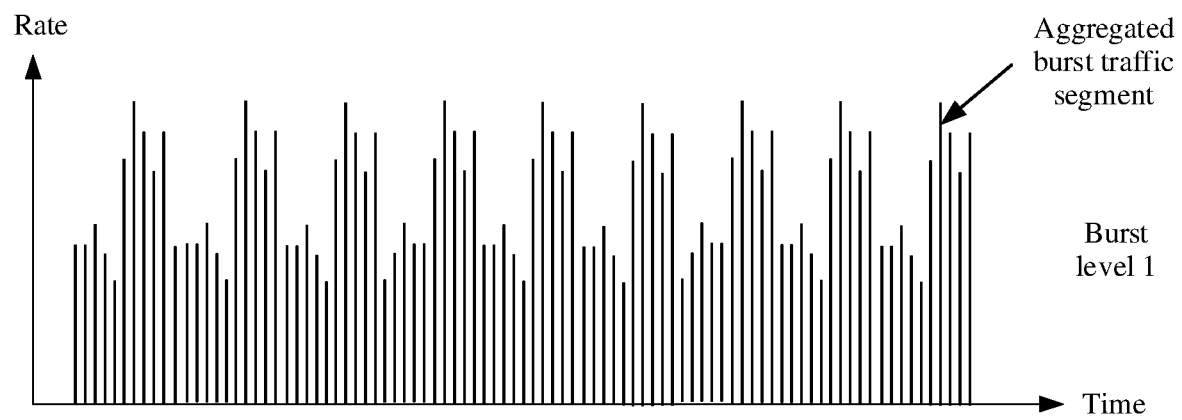
FIG. 1 is an example schematic diagram of a first packet flow according to an embodiment of this application.

The following further describes in detail implementations of this application with reference to the accompanying drawings.

In a transmission process, a packet may carry transmission information related to packet transmission, for example, a 2-tuple, a 5-tuple, or a 7-tuple. The 2-tuple includes a source internet protocol (IP) address and a destination IP address. The 5-tuple includes a source IP address, a source port number, a destination IP address, a destination port number, and a transport layer protocol number. The 7-tuple includes a source media access control (MAC) address, a destination MAC address, a source IP address, a destination IP address, a protocol number, a source port number, and a destination port number. If transmission information carried in a plurality of packets consecutively sent by a device (for example, a host, a virtual machine, or a network device) is the same, the plurality of packets form a packet flow. Therefore, a packet flow to which the packet belongs may be determined based on, for example, the 2-tuple, the 5-tuple, or the 7-tuple carried in the packet, or other information used to distinguish between packet flows.

A communication network, for example, a data center network (DCN), a metropolitan area network, a wide area network, a campus network, or a virtual private network (VPN), includes a plurality of network devices. The network devices are configured to forward packet flows between different workstations (for example, hosts and virtual machines) that access the communication network, to implement communication between the different workstations. In a process of forwarding a packet flow, the network device may extract a flow characteristic of the packet flow, to perform some processing based on the flow characteristic of the packet flow, for example, determining a forwarding policy of the packet flow based on the flow characteristic of the packet flow. The flow characteristic of the packet flow is, for example, a quantity of packets of the packet flow, a data volume of the packet flow (that is, a total quantity of bytes of the packets of the packet flow), or may be a transmission delay, jitter, a packet loss rate, or the like of the packet flow.

Currently, a network device usually extracts a flow characteristic of a packet flow in an offline mode, and the network device can extract only a flow characteristic of a stable packet flow. For example, the network device samples the packet flow by using technologies such as traffic port mirroring and network stream sampling, to obtain sampled data, and sends the sampled data to an analysis server, so that the analysis server analyzes the sampled data to obtain the flow characteristic of the packet flow. Because the network device sends the sampled data to the analysis server, and the analysis server obtains the flow characteristic of the packet flow, a manner of extracting the flow characteristic of the packet flow is the offline mode. However, extracting the flow characteristic of the packet flow in the offline mode requires the network device to collect and send a large quantity of data. The network device needs to consume a large quantity of bandwidth resources to send the sampled data to the analysis server, and the analysis server needs to perform a large quantity of calculations to obtain the flow characteristic of the packet flow. Consequently, this consumes a large quantity of storage resources, computing resources, and the like of the analysis server. In addition, the sampled data lacks complete information about the packet flow. Consequently, it is difficult for the flow characteristic that is of the packet flow and that is obtained by the analysis server to represent actual traffic of the packet flow, so that the flow characteristic obtained by the analysis server is inaccurate. Because the flow characteristic is extracted in the offline mode, interaction between the network device and the analysis server takes a long time, and the network device cannot respond to a change of the flow characteristic of the packet flow in time. The stable packet flow refers to a packet flow that is stably sent by a transmit end. A difference between data volumes (e.g., quantities of bytes of packets) of different packets in the packet flow is small, and a difference between time intervals between each packet and two packets that are adjacent to each packet is small.

However, with development of network technologies, network traffic continuously increases, and services carried on a network are increasingly enriched. To reduce processing overheads of a protocol stack and CPU load, a transmit end of a packet flow usually periodically sends a large quantity of packets, causing a traffic burst. Burst traffic is a main cause of packet loss and transmission delay increase on a communication network. Therefore, it is necessary to perform flow characteristic extraction on packet flows that include burst traffic, to process and forward these packet flows based on flow characteristics of these packet flows, implement differentiated processing on different packet flows, improve packet loss and transmission delay problems on the communication network, and ensure an SLA of a high-value service (for example, a video conference service or a voice service) carried on the communication network. The packet flows that include burst traffic are packet flows periodically sent by the transmit end. A difference between data volumes of different packets in these packet flows may be large, a difference between time intervals between each packet and two packets that are adjacent to each packet may be large, and packet intervals may be unevenly distributed. For example, the transmit end sends a large quantity of packets of a service flow A in first duration (or referred to as a first phase), does not send a packet of the service flow A in a period of time after the first duration, and sends the packet of the service flow A in second duration (or referred to as a second phase) after the period of time. Consequently, the traffic burst exists in the service flow A in the first duration and the second duration, and traffic in both the first duration and the second duration is burst traffic. The service flow A is a packet flow that includes burst traffic.

Embodiments of this application provide a flow characteristic extraction method and apparatus. A network device may extract, by using the flow characteristic extraction method, a flow characteristic of a packet flow that includes burst traffic. Specifically, the network device may determine a burst parameter of a burst traffic segment of a packet flow (for example, the first packet flow described in the following embodiments) that includes burst traffic, and determine a burst parameter of the first packet flow based on the burst parameter of the burst traffic segment of the first packet flow. The burst parameter of the first packet flow may represent a flow characteristic of the first packet flow. Therefore, the flow characteristic of the first packet flow is extracted, in other words, the flow characteristic of the packet flow that includes burst traffic is extracted. In the flow characteristic extraction method in embodiments of this application, the network device extracts the flow characteristic of the first packet flow. Therefore, the flow characteristic extraction method is a method for extracting a flow characteristic online, and can reduce consumption of a bandwidth resource, and avoid consumption of a storage resource and a computing resource of the analysis server. In addition, the network device may obtain complete information about a packet flow, a flow characteristic of a packet flow obtained by the network device can represent actual traffic of the packet flow, and the network device can respond to a change of a flow characteristic of a packet flow in time.

The flow characteristic extraction method in embodiments of this application is performed by a network device. The network device may be any network device configured to forward a service in a communication network. For example, in terms of device type, the network device may be a switch, a router, a virtual switch, a virtual router, or the like. In terms of device deployment location, the network device may be an edge network device or a core network device. For example, the edge network device may be a provider edge (PE) device, and the core network device may be a provider (P) device. This is not limited in embodiments of this application.

The following describes the technical solutions provided in embodiments of this application. In the following descriptions, an example in which a packet flow that includes burst traffic is a first packet flow is used. Therefore, the first packet flow is first described before the technical solutions provided in embodiments of this application are described.

In embodiments of this application, the first packet flow is an elephant flow, there is burst traffic in the first packet flow, and traffic of the first packet flow is represented as one or more bursts of n burst levels. A difference between burst degrees of burst traffic of a same burst level is small, and a difference between burst degrees of burst traffic of different burst levels is large. Because a traffic burst has a feature of periodicity, for ease of description, in embodiments of this application, the burst traffic is referred to as a burst traffic segment, and is defined based on a burst level. Burst traffic of each burst level is referred to as an aggregated burst traffic segment. The burst traffic segment and the first packet flow are described by using a burst parameter. The burst traffic segment includes a plurality of packets of the first packet flow, a burst parameter of the burst traffic segment may represent a flow characteristic of the burst traffic segment, and a burst parameter of the first packet flow may represent a flow characteristic of the first packet flow.

Because the traffic of the first packet flow is represented as the one or more bursts of n burst levels, the first packet flow includes one or more aggregated burst traffic segments of the n burst levels. In embodiments of this application, flow characteristics of different aggregated burst traffic segments of a same burst level are basically the same, and flow characteristics of aggregated burst traffic segments of different burst levels are different. For example, a difference between data volumes of different aggregated burst traffic segments of a same burst level is small, a difference between time intervals between an aggregated burst traffic segment and two aggregated burst traffic segments that are adjacent to the aggregated burst traffic segment and that are of a same burst level as the aggregated burst traffic segment is small, a difference between data volumes of aggregated burst traffic segments of different burst levels is large, and a difference between time intervals between adjacent aggregated burst traffic segments of different burst levels is large.

When n is an integer greater than 1, in ascending order of burst levels, data volumes of aggregated burst traffic segments of n burst levels increase sequentially, and time intervals between adjacent aggregated burst traffic segments of n burst levels increase sequentially. The $1^{st}$ burst level in the n burst levels is a lowest burst level, and an aggregated burst traffic segment of each of the $2^{nd}$ to an $n^{th}$ burst levels is obtained by aggregating aggregated burst traffic segments of the $1^{st}$ burst level, in other words, an aggregated burst traffic segment of each of the $2^{nd}$ to the $n^{th}$ burst levels includes a plurality of aggregated burst traffic segments of the $1^{st}$ burst level. Therefore, the aggregated burst traffic segment of the $1^{st}$ burst level may also be referred to as a bottom-layer burst traffic segment.

Figure 2:
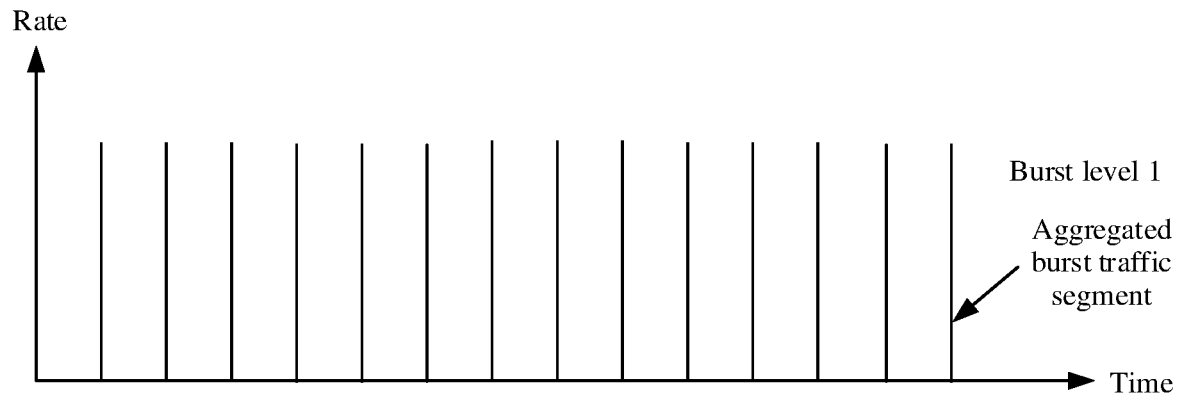
FIG. 2 is an example schematic diagram of another first packet flow according to an embodiment of this application.
Figure 3:
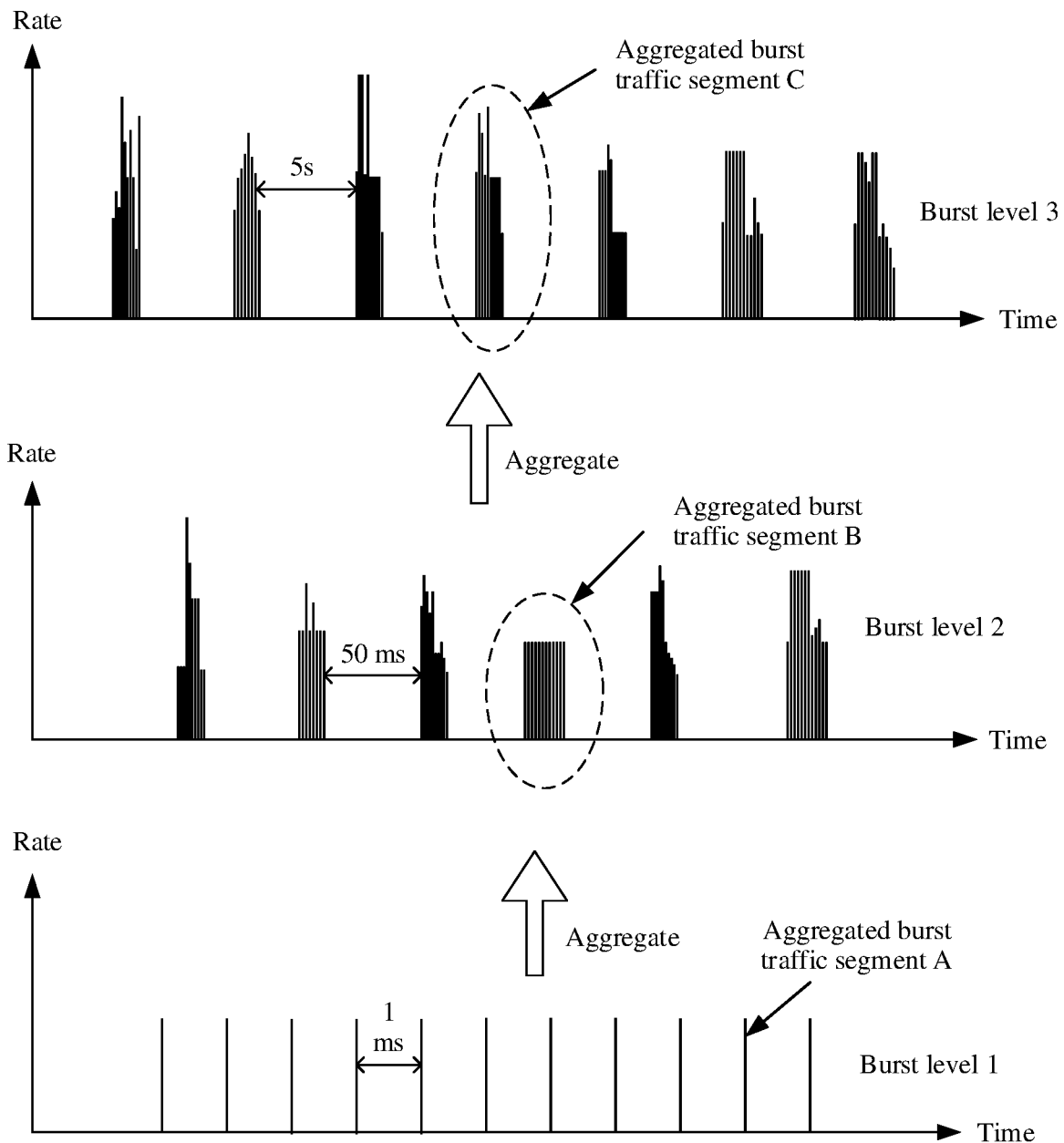
FIG. 3 is an example schematic diagram of still another first packet flow according to an embodiment of this application.

For example, FIG. 1 to FIG. 3 are schematic diagrams of three first packet flows according to embodiments of this application. The first packet flow shown in FIG. 1 and FIG. 2 may be a packet flow of a service that has a high transmission delay requirement, for example, real-time interaction. For example, the first packet flow shown in FIG. 1 is a packet flow of a service, for example, virtual reality (VR), video conference, voice, or power differential, and the first packet flow shown in FIG. 2 is a packet flow of a game service. The first packet flow shown in FIG. 3 may be a packet flow of a service that has a low transmission delay requirement, for example, on-demand video and downloading. In FIG. 1 to FIG. 3, a horizontal axis is a time axis, and a physical meaning of a vertical axis is a rate (or referred to as a burst rate) of an aggregated burst traffic segment. A corresponding length of each aggregated burst traffic segment on the horizontal axis is duration of the aggregated burst traffic segment. An interval between two adjacent aggregated burst traffic segments is a time interval between the two adjacent aggregated burst traffic segments. An area (a product of the duration and the rate) of each aggregated burst traffic segment in the figure represents a data volume of the aggregated burst traffic segment.

As shown in FIG. 1 and FIG. 2, traffic of the first packet flow is represented as a burst of one burst level (a burst level 1). The first packet flow includes a plurality of aggregated burst traffic segments of the burst level 1. Time intervals between each aggregated burst traffic segment and two aggregated burst traffic segments that are adjacent to each aggregated burst traffic segment are basically the same. Data volumes of different aggregated burst traffic segments are basically the same. The traffic of the first packet flow is represented as a uniform burst of one burst level. As shown in FIG. 3, traffic of the first packet flow is represented as bursts of three burst levels (a burst level 1, a burst level 2, and a burst level 3). The burst level 1, the burst level 2, and the burst level 3 are sorted in ascending order. The first packet flow includes a plurality of aggregated burst traffic segments A of the burst level 1, a plurality of aggregated burst traffic segments B of the burst level 2, and a plurality of aggregated burst traffic segments C of the burst level 3.

Each aggregated burst traffic segment A includes a plurality of consecutive packets in the first packet flow. Each aggregated burst traffic segment B is obtained by aggregating a plurality of consecutive aggregated burst traffic segments A. Different aggregated burst traffic segments B include different aggregated burst traffic segments A. Each aggregated burst traffic segment C is obtained by aggregating a plurality of consecutive aggregated burst traffic segments B (in other words, each aggregated burst traffic segment C is obtained by aggregating a plurality of consecutive aggregated burst traffic segments A, and a quantity of aggregated burst traffic segments A included in the aggregated burst traffic segment C is greater than a quantity of aggregated burst traffic segments A included in the aggregated burst traffic segment B). Different aggregated burst traffic segments C include different aggregated burst traffic segments B. A time interval between adjacent aggregated burst traffic segments A is 1 millisecond (ms). A time interval between adjacent aggregated burst traffic segments B is 50 ms. A time interval between adjacent aggregated burst traffic segments C is 5 seconds (s). Data volumes of different aggregated burst traffic segments A are basically equal, data volumes of different aggregated burst traffic segments B are basically equal, and data volumes of different aggregated burst traffic segments C are basically equal. However, there are large differences between a data volume of the aggregated burst traffic segment A, a data volume of the aggregated burst traffic segment B, and a data volume of the aggregated burst traffic segment C.

It can be learned from FIG. 1 to FIG. 3 that, a burst of a packet flow of a service that has a high transmission delay requirement, for example, real-time interaction, is small and regular, and the packet flow has a regular flow characteristic. A burst of a packet flow of a service that has a low transmission delay requirement, for example, on-demand video and downloading, is large, the burst is intermittent and unstable, and a flow characteristic of the packet flow is regular. It can be learned that packet flows of different services have different burst statuses, and packet flows of different services have different flow characteristics. This is because SLA requirements of different services are different, and manners in which a transmit end sends packet flows of different services are different. Because packet flows of different services have different flow characteristics, extraction of a flow characteristic of a packet flow is of great significance and has a wide range of application scenarios. For example, based on a flow characteristic of a packet flow, a service type of the packet flow may be determined, an SLA requirement level of the packet flow may be determined, an arrival model of the packet flow may be determined, and attack traffic may be detected.

It should be noted that FIG. 1 to FIG. 3 are merely used as examples, and do not constitute a limitation on the first packet flow provided in this application. The first packet flow may alternatively be another packet flow that includes burst traffic. In embodiments of this application, a "burst level" is used as an example for description. In some embodiments, the burst level is also referred to as a burst layer. Therefore, it may also be referred to as that the traffic of the first packet flow is represented as one or more bursts of n layers, or another similar description is used. This is not limited in embodiments of this application.

The foregoing describes the first packet flow in embodiments of this application. The following describes an embodiment of the flow characteristic extraction method in this application. In the method embodiment, an example in which a network device extracts a flow characteristic of a first packet flow is used for description.

Figure 4:
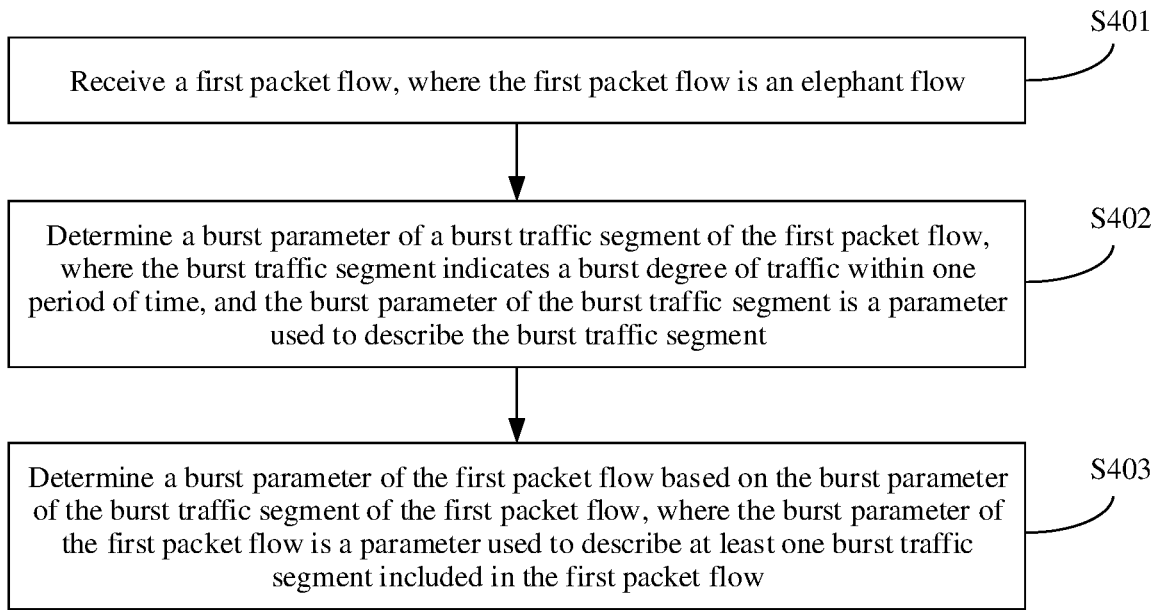
FIG. 4 is an example flowchart of a flow characteristic extraction method according to an embodiment of this application.

FIG. 4 is a flowchart of a flow characteristic extraction method according to an embodiment of this application. The flow characteristic extraction method may be executed by a network device. As shown in FIG. 4, the method may include the following steps S401 to S403.

S401: A first packet flow is received, where the first packet flow is an elephant flow.

The network device may receive the first packet flow from a previous hop of the network device on a transmission path of the first packet flow. The previous hop may be a transmit end of the first packet flow or an intermediate node device on the transmission path of the first packet flow. For example, the previous hop may be a network device or may be a workstation that accesses a communication network. This is not limited in this embodiment of this application.

The first packet flow is an elephant flow. There is burst traffic in the first packet flow. The first packet flow includes at least one burst traffic segment. Each burst traffic segment includes a plurality of consecutive packets in the first packet flow.

In an optional embodiment, traffic of the first packet flow is represented as one or more bursts of n burst levels, where n is a positive integer. For example, the first packet flow may be the packet flow shown in any one of FIG. 1 to FIG. 3.

S402: A burst parameter of a burst traffic segment of the first packet flow is determined, where the burst traffic segment indicates a burst degree of traffic within one period of time, and the burst parameter of the burst traffic segment is a parameter used to describe the burst traffic segment.

In an optional embodiment, the network device may determine the burst parameter of the burst traffic segment of the first packet flow after receiving the first packet flow, or may determine the burst parameter of the burst traffic segment of the first packet flow in a process of receiving the first packet flow. This is not limited in this embodiment of this application. In this embodiment of this application, an example in which the network device determines the burst parameter of the burst traffic segment of the first packet flow in the process of receiving the first packet flow is used for description.

Each burst traffic segment of the first packet flow indicates a traffic burst degree of the first packet flow within one period of time. A burst parameter of each burst traffic segment is a parameter used to describe the burst traffic segment. The burst parameter of each burst traffic segment may represent a flow characteristic of the burst traffic segment. The burst parameter of each burst traffic segment includes at least one of the following: a data volume of the burst traffic segment, duration of the burst traffic segment, and a time interval between the burst traffic segment and a burst traffic segment adjacent to the burst traffic segment. The data volume of the burst traffic segment refers to a total quantity of bytes of the burst traffic segment, that is, a sum of bytes of a plurality of packets included in the burst traffic segment.

Figure 5:
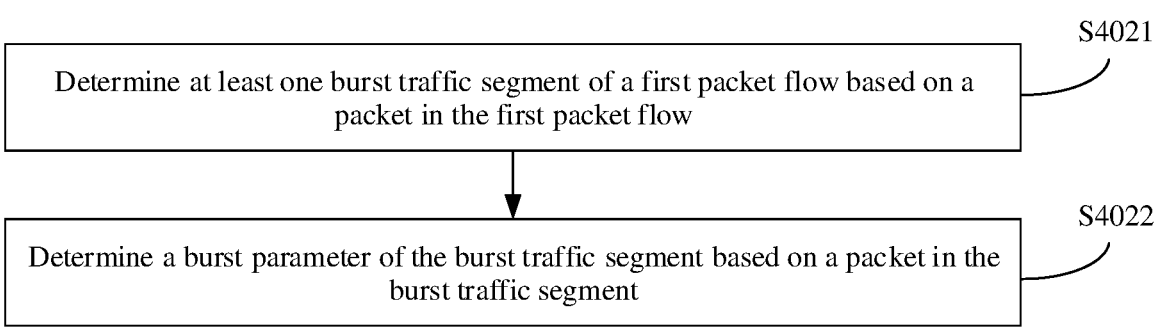
FIG. 5 is an example flowchart of determining a burst parameter of a burst traffic segment of a first packet flow according to an embodiment of this application.

In an example, FIG. 5 is a flowchart of determining a burst parameter of a burst traffic segment of a first packet flow according to an embodiment of this application. As shown in FIG. 5, the method includes the following steps S4021 and S4022.

S4021: The at least one burst traffic segment of the first packet flow is determined based on a packet in the first packet flow.

In an optional embodiment, for each packet (for example, a first packet) in the first packet flow, the network device determines a time interval between the first packet and a second packet (where the second packet is adjacent to the first packet), and the network device determines, based on the time interval between the first packet and the second packet, whether the first packet and the second packet belong to a same burst traffic segment. In this manner, the network device may determine the at least one burst traffic segment of the first packet flow. The time interval between the first packet and the second packet may be a time difference between a timestamp at which the network device receives the first packet and a timestamp at which the network device receives the second packet.

For example, that the network device determines, based on the time interval between the first packet and the second packet, whether the first packet and the second packet belong to a same burst traffic segment includes: The network device determines whether the time interval between the first packet and the second packet is less than an interval threshold; and if the time interval between the first packet and the second packet is less than the interval threshold, the network device determines that the first packet and the second packet belong to a same burst traffic segment; or if the time interval between the first packet and the second packet is not less than the interval threshold, the network device determines that the first packet and the second packet do not belong to a same burst traffic segment. The interval threshold may be determined based on a traffic burst status in an actual service transmission process.

In this embodiment of this application, each burst traffic segment determined by the network device includes a plurality of consecutive packets. If the network device determines a plurality of burst traffic segments, the plurality of burst traffic segments are sequentially arranged in a time sequence.

S4022: A burst parameter of the burst traffic segment is determined based on a packet in the burst traffic segment.

The burst parameter of each burst traffic segment includes at least one of the following: a data volume of the burst traffic segment, duration of the burst traffic segment, and a time interval between the burst traffic segment and a burst traffic segment adjacent to the burst traffic segment. Correspondingly, that the network device determines the burst parameter of each burst traffic segment includes at least one of the following.

(1) For each burst traffic segment, the network device determines a sum of bytes of all packets in the burst traffic segment, and the network device determines the sum of the bytes of all the packets in the burst traffic segment as the data volume of the burst traffic segment.

(2) For each burst traffic segment, the network device determines a time difference (for example, a time difference A) between a time stamp at which the network device receives the $1^{st}$ packet in the burst traffic segment and a time stamp at which the network device receives the last packet in the burst traffic segment, and the network device determines the time difference A as the duration of the burst traffic segment.

(3) For each burst traffic segment, the network device determines a time difference between a time stamp at which the network device receives the last packet in the burst traffic segment and a time stamp at which the network device receives the $1^{st}$ packet in a burst traffic segment next to the burst traffic segment, and the network device determines the time difference (for example, a time difference B) as the time interval between the burst traffic segment and a burst traffic segment adjacent to the burst traffic segment.

S403: A burst parameter of the first packet flow is determined based on the burst parameter of the burst traffic segment of the first packet flow, where the burst parameter of the first packet flow is a parameter used to describe the at least one burst traffic segment included in the first packet flow.

After determining the burst parameter of the burst traffic segment of the first packet flow, the network device determines the burst parameter of the first packet flow based on the burst parameter of the burst traffic segment of the first packet flow. The burst parameter of the first packet flow is a parameter used to describe the at least one burst traffic segment included in the first packet flow. The burst parameter of the first packet flow may represent a flow characteristic of the first packet flow.

Figure 6:
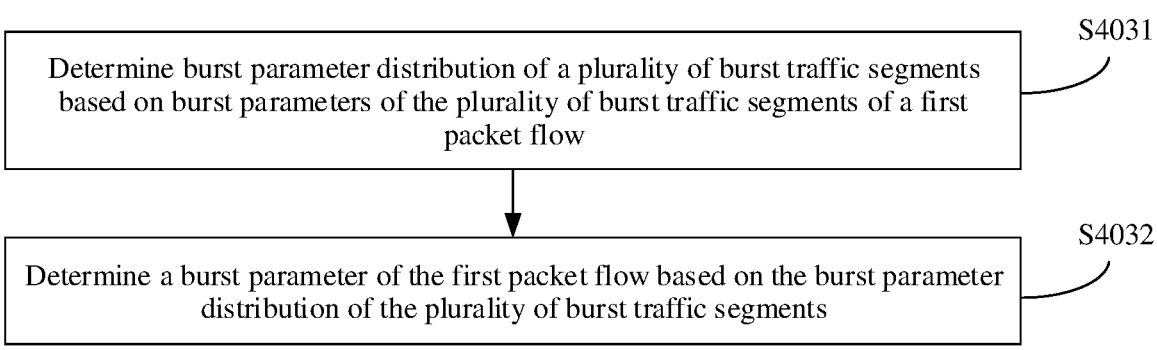
FIG. 6 is an example flowchart of determining a burst parameter of a first packet flow according to an embodiment of this application.

In an optional embodiment, the first packet flow includes a plurality of burst traffic segments. In an example, FIG. 6 is a flowchart of determining a burst parameter of a first packet flow based on a burst parameter of a burst traffic segment of the first packet flow according to an embodiment of this application. As shown in FIG. 6, the method includes the following steps S4031 and S4032.

S4031: Burst parameter distribution of the plurality of burst traffic segments is determined based on burst parameters of the plurality of burst traffic segments of the first packet flow.

The network device may determine the burst parameter distribution of the plurality of burst traffic segments based on the burst parameters of the plurality of burst traffic segments of the first packet flow. As described above, the burst parameter of each burst traffic segment includes at least one of the following: a data volume of the burst traffic segment, duration of the burst traffic segment, and a time interval between the burst traffic segment and a burst traffic segment adjacent to the burst traffic segment (where for brevity of description, a time interval between each burst traffic segment and a burst traffic segment adjacent to the burst traffic segment is referred to as a time interval corresponding to the burst traffic segment). Therefore, in this embodiment of this application, the burst parameter distribution includes at least one of data volume distribution, duration distribution, and time interval distribution. The data volume distribution includes a plurality of data volumes and a quantity (for example, a quantity of burst traffic segments whose data volumes are a) of burst traffic segments of each of the plurality of data volumes. The duration distribution includes a plurality of data volumes and total duration (for example, a sum of duration of all burst traffic segments whose data volumes are a) of burst traffic segments of each of the plurality of data volumes. The time interval distribution includes a plurality of time intervals and a quantity (for example, a quantity of burst traffic segments corresponding to a time interval Δt1) of burst traffic segments corresponding to each of the plurality of time intervals. The plurality of data volumes are determined based on data volumes of the plurality of burst traffic segments. The plurality of time intervals are determined based on time intervals corresponding to the plurality of burst traffic segments.

In an example of S4031 (for ease of description, this example is referred to as a first example of S4031), data volume distribution that is of the plurality of burst traffic segments and that is determined by the network device is shown in Table 1, duration distribution of the plurality of burst traffic segments is shown in Table 2, and time interval distribution of the plurality of burst traffic segments is shown in Table 3.

TABLE 1

| Data volume distribution | | | | | | | | |
|---|---|---|---|---|---|---|---|---|
| Data volume (KB) | 1 | 2 | 4 | 8 | 16 | 32 | 64 | 128 |
| Quantity | 0 | 51 | 91 | 305 | 1609 | 0 | 0 | 0 |

TABLE 2

| Duration distribution | | | | | | | | |
|---|---|---|---|---|---|---|---|---|
| Data volume (KB) | 1 | 2 | 4 | 8 | 16 | 32 | 64 | 128 |
| Total duration (μs) | 0 | 0 | 232 | 2916 | 28795 | 0 | 0 | 0 |

TABLE 3

| Time interval distribution | | | | | | | | | | | | |
|---|---|---|---|---|---|---|---|---|---|---|---|---|
| Time interval (μs) | 0.5 | 1 | 2 | 4 | 8 | 16 | 32 | 64 | 128 | 256 | 512 | 1024 | 2048 |
| Quantity | 536 | 1273 | 87 | 15 | 5 | 11 | 36 | 75 | 2 | 0 | 0 | 1 | 15 |

In another example of S4031 (for ease of description, this example is referred to as a second example of S4031), data volume distribution that is of the plurality of burst traffic segments and that is determined by the network device is shown in Table 4, duration distribution of the plurality of burst traffic segments is shown in Table 5, and time interval distribution of the plurality of burst traffic segments is shown in Table 6.

TABLE 4

| Data volume distribution | | | | | | | | |
|---|---|---|---|---|---|---|---|---|
| Data volume (KB) | 1 | 2 | 4 | 8 | 16 | 32 | 64 | 128 |
| Quantity | 0 | 185 | 8435 | 2180 | 2728 | 1062 | 22 | 0 |

TABLE 5

| Duration distribution | | | | | | | | |
|---|---|---|---|---|---|---|---|---|
| Data volume (KB) | 1 | 2 | 4 | 8 | 16 | 32 | 64 | 128 |
| Total duration (μs) | 0 | 2294 | 124659 | 260472 | 719187 | 507848 | 20906 | 0 |

TABLE 6

| Time interval distribution | | | | | | | | | | | | |
|---|---|---|---|---|---|---|---|---|---|---|---|---|
| Time interval (μs) | 0.5 | 1 | 2 | 4 | 8 | 16 | 32 | 64 | 128 | 256 | 512 | 1024 | 2048 |
| Quantity | 7568 | 166 | 66 | 333 | 962 | 3871 | 1176 | 394 | 74 | 2 | 0 | 0 | 0 |

S4032: The burst parameter of the first packet flow is determined based on the burst parameter distribution of the plurality of burst traffic segments.

After determining the burst parameter distribution of the plurality of burst traffic segments of the first packet flow, the network device determines the burst parameter of the first packet flow based on the burst parameter distribution of the plurality of burst traffic segments. In this embodiment of this application, the traffic of the first packet flow is represented by n burst levels. The first packet flow includes aggregated burst traffic segments of n burst levels. The aggregated burst traffic segments are determined based on burst traffic segments of the first packet flow, and n is a positive integer. The burst parameter of the first packet flow includes at least one of the following: a quantity of burst levels of the first packet flow and a burst parameter of an aggregated burst traffic segment of each burst level of the first packet flow. The burst parameter of the aggregated burst traffic segment is a parameter used to describe the aggregated burst traffic segment. The burst parameter of the aggregated burst traffic segment of each burst level includes at least one of the following: a data volume of the aggregated burst traffic segment of the burst level, duration of the aggregated burst traffic segment of the burst level, a rate of the aggregated burst traffic segment of the burst level, and a time interval between adjacent aggregated burst traffic segments of the burst level. A time interval between adjacent aggregated burst traffic segments of each burst level may be a specific time interval, or may be a time interval range. This is not limited in this embodiment of this application.

In an optional embodiment, n is an integer greater than 1. In ascending order of burst levels, data volumes of the aggregated burst traffic segments of n burst levels increase sequentially, and time intervals between adjacent aggregated burst traffic segments of n burst levels increase sequentially. In addition, an aggregated burst traffic segment of each of the $2^{nd}$ to an $n^{th}$ burst levels of the n burst levels is obtained by aggregating aggregated burst traffic segments of the $1^{st}$ burst level. The $1^{st}$ burst level is a lowest burst level. According to this, step S4032 includes at least one substep of the following steps S4032a to S4032e.

S4032a: The network device determines a first data volume in the data volume distribution of the plurality of burst traffic segments as a data volume of an aggregated burst traffic segment of the $1^{st}$ burst level. The $1^{st}$ burst level is a lowest burst level in the n burst levels. The first data volume is a data volume corresponding to a largest quantity of burst traffic segments in the data volume distribution.

It can be learned from the descriptions of S4021 that the burst traffic segment is determined based on the packet of the first packet flow. Therefore, the burst traffic segment determined by the network device in S4021 is a burst traffic segment of a lowest burst level of the first packet flow. In addition, because the $1^{st}$ burst level is a lowest burst level in the n burst levels, and the aggregated burst traffic segment of each of the $2^{nd}$ to the $n^{th}$ burst levels is obtained by aggregating the aggregated burst traffic segments of the $1^{st}$ burst level, burst traffic segments corresponding to the data volume of the aggregated burst traffic segment of the $1^{st}$ burst level are burst traffic segments with a largest quantity and determined by the network device in S4021. In view of this, the network device determines the first data volume in the data volume distribution as the data volume of the aggregated burst traffic segment of the $1^{st}$ burst level. The first data volume is the data volume corresponding to a largest quantity of burst traffic segments in the data volume distribution. Optionally, the aggregated burst traffic segment of the $1^{st}$ burst level is usually small. For example, the data volume of the aggregated burst traffic segment of the $1^{st}$ burst level is less than a preset data volume, and the preset data volume may be determined based on a burst degree of a packet flow.

In an example of S4032a (for ease of description, this example is referred to as a first example of S4032a), data volume distribution of the plurality of burst traffic segments of the first packet flow is shown in Table 1. As shown in Table 1, in the data volume distribution, a quantity (1609) of burst traffic segments corresponding to a data volume of 16 KB is the largest. Therefore, the network device determines that the data volume of the aggregated burst traffic segment of the $1^{st}$ burst level is 16 KB. That is, the first data volume is 16 KB.

In another example of S4032a (for ease of description, this example is referred to as a second example of S4032a), data volume distribution of the plurality of burst traffic segments of the first packet flow is shown in Table 4. As shown in Table 4, in the data volume distribution, a quantity (8435) of burst traffic segments corresponding to a data volume of 4 KB is the largest. Therefore, the network device determines that the data volume of the aggregated burst traffic segment of the $1^{st}$ burst level is 4 KB. That is, the first data volume is 4 KB.

S4032b: The network device determines n interval levels based on the time interval distribution of the plurality of burst traffic segments, where each interval level includes at least one time interval, quantities of burst traffic segments corresponding to time intervals in each interval level increase sequentially from a boundary of the interval level to a center of the interval level, and time intervals in the n interval levels increase sequentially. The network device determines a time interval between adjacent aggregated burst traffic segments of the $k^{th}$ burst level based on a time interval in the $k^{th}$ interval level of the n interval levels, where $1 \le k \le n$, and k is an integer.

The network device may analyze the time interval distribution of the plurality of burst traffic segments, to rank the time intervals in the time interval distribution based on the quantities of burst traffic segments in the time interval distribution, to obtain n interval levels. After obtaining the n interval levels, the network device determines a time interval in which a largest quantity of corresponding burst traffic segments are distributed and that is in the $k^{th}$ interval level, as the time interval between adjacent aggregated burst traffic segments of the $k^{th}$ burst level.

In an example of S4032b (for ease of description, this example is referred to as a first example of S4032b), time interval distribution of the plurality of burst traffic segments of the first packet flow is shown in Table 3. The network device ranks the time intervals in the time interval distribution based on the quantities of burst traffic segments in the time interval distribution, to obtain three interval levels: an interval level 1 (namely, the $1^{st}$ interval level), an interval level 2 (namely, the $2^{nd}$ interval level), and an interval level 3 (namely, the $3^{rd}$ interval). The interval level 1 includes five time intervals: 0.5 μs, 1 μs, 2 μs, 4 μs, and 8 μs. The interval level 2 includes five time intervals: 16 μs, 32 μs, 64 μs, 128 μs, and 256 μs. The interval level 3 includes three time intervals: 512 μs, 1024 μs, and 2048 μs. In each of the interval level 1, the interval level 2, and the interval level 3, quantities of burst traffic segments corresponding to time intervals in the interval level increase sequentially from a boundary of the interval level to a center of the interval level. Time intervals of the interval level 1, time intervals of the interval level 2, and time intervals of the interval level 3 increase in sequence. For example, quantities of burst traffic segments corresponding to the five time intervals in the interval level 1 are 536, 1273, 87, 15, and 5 in sequence. This is represented as increasing from a boundary of the interval level 1 (for example, a location corresponding to the time interval 0.5 μs and a location corresponding to the time interval 8 μs) to a center of the interval level 1 (for example, a location corresponding to the time interval 1273 μs). For another example, quantities of burst traffic segments corresponding to the five time intervals in the interval level 2 are 11, 36, 75, 2, and 0 in sequence. This is represented as increasing from a boundary of the interval level 2 (for example, a location corresponding to the time interval 16 μs and a location corresponding to the time interval 256 μs) to a center of the interval level 2 (for example, a location corresponding to the time interval 64 μs). After the network device determines the three interval levels, for the interval level 1, because a quantity (1273) of burst traffic segments corresponding to the time interval 1 μs in the interval level 1 is the largest, the network device determines that a time interval between adjacent aggregated burst traffic segments of the $1^{st}$ burst level is 1 microsecond (μs). For the interval level 2, because both the time interval 32 μs and the time interval 64 μs in the interval level 2 correspond to large quantities of burst traffic segments (a quantity of burst traffic segments corresponding to the time interval 32 μs is 36, and a quantity of burst traffic segments corresponding to the time interval 64 μs is 75), the network device determines that a time interval between adjacent aggregated burst traffic segments of the $2^{nd}$ burst level ranges from 32 μs to 64 μs. For the interval level 3, because a quantity (15) of burst traffic segments corresponding to the time interval 2048 μs in the interval level 3 is the largest, the network device determines that a time interval between adjacent aggregated burst traffic segments of the $3^{rd}$ burst level is 2048 μs.

In another example of S4032b (for ease of description, this example is referred to as a second example of S4032b), time interval distribution of the plurality of burst traffic segments of the first packet flow is shown in Table 6. The network device ranks the time intervals in the time interval distribution based on the quantities of burst traffic segments in the time interval distribution, to obtain two interval levels: an interval level 1 (namely, the $1^{st}$ interval level) and an interval level 2. The interval level 1 includes three time intervals: 0.5 μs, 1 μs, and 2 μs. The interval level 2 includes 10 time intervals: 4 μs, 8 μs, 16 μs, 32 μs, 64 μs, 128 μs, 256 μs, 512 μs, 1024 μs, and 2048 μs. In each of the interval level 1 and the interval level 2, quantities of burst traffic segments corresponding to time intervals in the interval level increase sequentially from a boundary of the interval level to a center of the interval level. Time intervals of the interval level 1, and time intervals of the interval level 2 increase in sequence. For example, quantities of burst traffic segments corresponding to the 10 time intervals in the interval level 2 are 333, 962, 3871, 1176, 394, 74, 2, 0, 0 and 0 in sequence. This is represented as increasing from a boundary of the interval level 2 (for example, a location corresponding to the time interval 4 μs and a location corresponding to the time interval 2048 μs) to a center of the interval level 2 (for example, a location corresponding to the time interval 16 μs and a location corresponding to the time interval 32 μs). After the network device determines the two interval levels, for the interval level 1, because a quantity (7568) of burst traffic segments corresponding to the time interval 0.5 μs in the interval level 1 is the largest, the network device determines that a time interval between adjacent aggregated burst traffic segments of the $1^{st}$ burst level is 0.5 μs. For the interval level 2, because both the time interval 16 μs and the time interval 32 μs in the interval level 2 correspond to large quantities of burst traffic segments (a quantity of burst traffic segments corresponding to the time interval 16 μs is 3871, and a quantity of burst traffic segments corresponding to the time interval 32 μs is 1176), the network device determines that a time interval between adjacent aggregated burst traffic segments of the $2^{nd}$ burst level ranges from 16 μs to 32 μs.

S4032c: The network device determines a data volume of an aggregated burst traffic segment of an $i^{th}$ burst level based on a total quantity of burst traffic segments in the time interval distribution of the plurality of burst traffic segments, a total quantity of burst traffic segments corresponding to a time interval of an $i^{th}$ interval level of the n interval levels, and the data volume of the aggregated burst traffic segment of the $1^{st}$ burst level of the n burst levels, where $1<i \leq n$, and i is an integer.

The total quantity of burst traffic segments in the time interval distribution of the plurality of burst traffic segments is a quantity of the plurality of burst traffic segments. The total quantity of burst traffic segments corresponding to the time interval of the $i^{th}$ interval level is a sum of quantities of burst traffic segments corresponding to each time interval of the $i^{th}$ interval level.

In an optional embodiment, the network device determines the data volume of the aggregated burst traffic segment of the $i^{th}$ burst level according to a data volume formula. The data volume formula may be $Di=(Q/Si) \times D1$. In the data volume formula, Di represents the data volume of the aggregated burst traffic segment of the $i^{th}$ burst level, Q represents the total quantity of burst traffic segments in the time interval distribution, Si represents the total quantity of burst traffic segments corresponding to the time interval of the $i^{th}$ interval level, D1 represents the data volume of the aggregated burst traffic segment of the $1^{st}$ burst level, a symbol "/" represents a division sign, and a symbol "×" represents a multiplication sign.

It can be learned from the foregoing descriptions that, the aggregated burst traffic segment of each of the $2^{nd}$ to the $n^{th}$ burst levels is obtained by aggregating aggregated burst traffic segments of the $1^{st}$ burst level. Therefore, in the foregoing data volume formula, Q/Si may represent a quantity of aggregated burst traffic segments that are of the $1^{st}$ burst level and that are included in the aggregated burst traffic segment of the $i^{th}$ burst level, that is, the aggregated burst traffic segment of the $i^{th}$ burst level is obtained by aggregating Q/Si aggregated burst traffic segments of the $1^{st}$ burst level.

In an example of S4032c (for ease of description, this example is referred to as a first example of S4032c), time interval distribution of the plurality of burst traffic segments of the first packet flow is shown in Table 3. The network device determines that the total quantity of burst traffic segments in the time interval distribution is Q=536+1273+87+15+5+11+36+75+2+0+0+1+15=2056. For the three interval levels determined by the network device based on the time interval distribution, refer to the first example in S4032b. The network device determines that the data volume of the aggregated burst traffic segment of the $1^{st}$ burst level is 16 KB (as shown in the first example in S4032a). For the $2^{nd}$ interval level (namely, an interval level 2) of the three interval levels, the network device determines that a total quantity of burst traffic segments corresponding to a time interval in the $2^{nd}$ interval level is S2=11+36+75+2+0=124. Therefore, the network device determines, according to the foregoing data volume formula, that a data volume of an aggregated burst traffic segment of the $2^{nd}$ burst level is D2=(Q/S2)×D1=(2056/124)×16≈16×16=256 KB. For the $3^{rd}$ interval level (namely, an interval level 3) of the three interval levels, the network device determines that a total quantity of burst traffic segments corresponding to a time interval in the $3^{rd}$ interval level is S3=0+1+15=16. Therefore, the network device determines, according to the foregoing data volume formula, that a data volume of an aggregated burst traffic segment of the $3^{rd}$ burst level is D3=(Q/S3)×D1=(2056/16)×16≈128×16=2048 KB.

In another example of S4032c (for ease of description, this example is referred to as a second example of S4032c), time interval distribution of the plurality of burst traffic segments of the first packet flow is shown in Table 6. The network device determines that the total quantity of burst traffic segments in the time interval distribution is Q=7568+166+66+333+962+3871+1176+394+74+2+0+0+0=14612. For the two interval levels determined by the network device based on the time interval distribution, refer to the second example in S4032b. The network device determines that the data volume of the aggregated burst traffic segment of the $1^1$ burst level is 4 KB (as shown in the second example in S4032a). For the $2^{nd}$ interval level (namely, an interval level 2) of the two interval levels, the network device determines that a total quantity of burst traffic segments corresponding to a time interval in the $2^{nd}$ interval level is S2=333+962+3871+1176+394+74+2+0+0+0=6812. Therefore, the network device determines, according to the foregoing data volume formula, that a data volume of an aggregated burst traffic segment of the $2^{nd}$ burst level is D2=(Q/S2)×D1= (14612/6812)×4≈2×4=8 KB.

S4032d: The network device determines duration of an aggregated burst traffic segment of the $k^{th}$ burst level based on total duration corresponding to a data volume of the aggregated burst traffic segment of the $k^{th}$ burst level in the duration distribution of the plurality of burst traffic segments and a quantity of burst traffic segments corresponding to the data volume of the aggregated burst traffic segment of the $k^{th}$ burst level in the data volume distribution of the plurality of burst traffic segments, where 1≤k≤n, and k is an integer.

It can be learned from S4031 that the duration distribution of the plurality of burst traffic segments includes the plurality of data volumes and the total duration of burst traffic segments of each of the plurality of data volumes, and the data volume distribution of the plurality of burst traffic segments includes a plurality of data volumes and a quantity of burst traffic segments of each of the plurality of data volumes. In S4032d, the network device may first determine, in the duration distribution and based on the data volume that is of the aggregated burst traffic segment of the $k^{th}$ burst level and that is determined in S4032a or S4032c, the total duration corresponding to the data volume (that is, the data volume of the aggregated burst traffic segment of the $k^{th}$ burst level, for example, a data volume k), and determine, in the data volume distribution, the quantity of burst traffic segments corresponding to the data volume (that is, the data volume of the aggregated burst traffic segment of the $k^{th}$ burst level, for example, the data volume k). Then, the network device determines, according to a duration formula and based on the total duration corresponding to the data volume in the duration distribution and the quantity of burst traffic segments corresponding to the data volume in the data volume distribution, the duration of the aggregated burst traffic segment of the $k^{th}$ burst level.

In an optional embodiment, the duration formula may be: $Tk=T_{Dk}/S_{Dk}$. In the duration formula, Tk represents the duration of the aggregated burst traffic segment of the $k^{th}$ burst level, Dk represents the data volume of the aggregated burst traffic segment of the $k^{th}$ burst level, $T_{Dk}$ represents the total duration corresponding to the data volume Dk in the duration distribution, $S_{Dk}$ represents the quantity of burst traffic segments corresponding to the data volume Dk in the data volume distribution, and a symbol "/" represents a division sign.

In an example of S4032d (for ease of description, this example is referred to as a first example of S4032d), data volume distribution of the plurality of burst traffic segments of the first packet flow is shown in Table 1, and duration distribution of the plurality of burst traffic segments is shown in Table 2. For the $1^{st}$ burst level of the n burst levels, in S4032a, the network device determines that a data volume of an aggregated burst traffic segment of the $1^{st}$ burst level is 16 KB (as shown in the first example in S4032a, that is, D1=16 KB). In S4032d, the network device determines, in the data volume distribution shown in Table 1, that the quantity of burst traffic segments corresponding to the data volume D1 (that is, 16 KB) of the aggregated burst traffic segment of the $1^{st}$ burst level is 1609 (that is, $S_{D1}$=1609). The network device determines, in the duration distribution shown in Table 2, that the total duration corresponding to the data volume D1 (that is, 16 KB) of the aggregated burst traffic segment of the $1^{st}$ burst level is 28795 μs. Therefore, the network device determines, according to the foregoing duration formula, that duration of the aggregated burst traffic segment of the $1^{st}$ burst level is $T1=T_{D1}/S_{D1}$=28795/1609≈17.8 pts. It can be learned from the first example in S4032c that the data volume D2 of the aggregated burst traffic segment of the $2^{nd}$ a burst level is 256 KB, and the data volume D3 of the aggregated burst traffic segment of the $3^{rd}$ burst level is 2048 K B. For brevity of description, in this embodiment of this application, these data volumes are not shown in the data volume distribution shown in Table 1 and the duration distribution shown in Table 2. Therefore, determining of duration of the aggregated burst traffic segment of the $2^{nd}$ burst level and duration of the aggregated burst traffic segment of the $3^{rd}$ burst level is not described herein again. For a manner of determining the duration, refer to the manner of determining the duration of the aggregated burst traffic segment of the $1^{st}$ burst level.

In another example of S4032d (for ease of description, this example is referred to as a second example of S4032d), data volume distribution of the plurality of burst traffic segments of the first packet flow is shown in Table 4, and duration distribution of the plurality of burst traffic segments is shown in Table 5. For the $1^{st}$ burst level of the n burst levels, in S4032a, the network device determines that a data volume of an aggregated burst traffic segment of the $1^{st}$ burst level is 4 KB (as shown in the second example in S4032a, that is, D1=4 KB). In S4032d, the network device determines, in the data volume distribution shown in Table 4, that the quantity of burst traffic segments corresponding to the data volume D1 (that is, 4 KB) of the aggregated burst traffic segment of the $1^{st}$ burst level is 8435 (that is, $S_{D1}$=8435). The network device determines, in the duration distribution shown in Table 5, that the total duration corresponding to the data volume D1 (that is, 4 KB) of the aggregated burst traffic segment of the $1^{st}$ burst level is 124659 μs. Therefore, the network device determines, according to the foregoing duration formula, that duration of the aggregated burst traffic segment of the $1^{st}$ burst level is T1=$T_{D1}$/$S_{D1}$=124659/8435≈14.8 μs. For the $2^{nd}$ burst level of the n burst levels, in S4032c, the network device determines that a data volume of an aggregated burst traffic segment of the $2^{nd}$ burst level is 8 KB (as shown in the second example in S4032c, that is, D2=8 KB). In S4032d, the network device determines, in the data volume distribution shown in Table 4, that the quantity of burst traffic segments corresponding to the data volume D2 (that is, 8 KB) of the aggregated burst traffic segment of the $1^{st}$ burst level is 2180 (that is, $S_{D2}$=2180). The network device determines, in the duration distribution shown in flow, the network device may determine the quantity of burst levels of the first packet flow. For example, the network device determines, based on the burst parameter distribution of the plurality of burst traffic segments of the first packet flow shown in Table 1 to Table 3, that the quantity of burst levels of the first packet flow is 3. The network device determines, based on the burst parameter distribution of the plurality of burst traffic segments of the first packet flow shown in Table 4 to Table 6, that the quantity of burst levels of the first packet flow is 2.

For example, the network device determines a burst parameter of the first packet flow based on the burst parameter distribution of the plurality of burst traffic segments of the first packet flow shown in Table 1 to Table 3, as shown in Table 7. The network device determines a burst parameter of the first packet flow based on the burst parameter distribution of the plurality of burst traffic segments of the first packet flow shown in Table 4 to Table 6, as shown in Table 8.

TABLE 7

| | Burst parameter of first packet flow | | | | | | | | | | | |
|---|---|---|---|---|---|---|---|---|---|---|---|---|
| | $1^{st}$ burst level | | | | $2^{nd}$ burst level | | | | $3^{rd}$ burst level | | | |
| Burst level | Data volume (KB) | Duration (μs) | Rate (Mbps) | Time interval (μs) | Data volume (KB) | Duration (μs) | Rate (Mbps) | Time interval (μs) | Data volume (KB) | Duration (μs) | Rate (Mbps) | Time interval (μs) |
| 3 | 16 | 17.8 | 7191 | 1 | 256 | . . . | . . . | 32~64 | 2048 | . . . | . . . | 2048 |

TABLE 8

| | Burst parameter of first packet flow | | | | | | | |
|---|---|---|---|---|---|---|---|---|
| | $1^{st}$ burst level | | | | $2^{nd}$ burst level | | | |
| Burst level | Data volume (KB) | Duration (μs) | Rate (Mbps) | Time interval (μs) | Data volume (KB) | Duration (μs) | Rate (Mbps) | Time interval (μs) |
| 2 | 4 | 14.8 | 2162 | 0.5 | 8 | 119.5 | 6538 | 16~32 |

Table 5, that the total duration corresponding to the data volume D2 (that is, 8 KB) of the aggregated burst traffic segment of the $2^{nd}$ burst level is 260472 μs. Therefore, the network device determines, according to the foregoing duration formula, that duration of the aggregated burst traffic segment of the $2^{nd}$ burst level is T1=TD1/SD1=124659/8435≈119.5 μs.

S4032e: The network device determines a rate of the aggregated burst traffic segment of the $k^{th}$ burst level based on the data volume of the aggregated burst traffic segment of the $k^{th}$ burst level and the duration of the aggregated burst traffic segment of the $k^{th}$ burst level, where 1≤k≤n, and k is an integer.

In an optional embodiment, the network device determines the rate of the aggregated burst traffic segment of the $k^{th}$ burst level according to a rate formula. The rate formula may be: Vk=Dk/Tk, where Dk represents the data volume of the aggregated burst traffic segment of the $k^{th}$ burst level, Tk represents the duration of the aggregated burst traffic segment of the $k^{th}$ burst level, and a symbol "/" represents a division sign.

After determining the burst parameter of the aggregated burst traffic segment of each burst level of the first packet The ellipsis shown in Table 7 indicates that corresponding data is not provided in this embodiment, and does not indicate that the data does not exist. For example, the duration of the aggregated burst traffic segment of the $2^{nd}$ burst level is represented by using an ellipsis. This does not indicate that the duration of the aggregated burst traffic segment of the $2^{nd}$ burst level does not exist, and only indicates that the duration of the aggregated burst traffic segment of the $2^{nd}$ burst level is not provided in this embodiment. The rest may be deduced by analogy.

In this embodiment of this application, after determining the burst parameter of the first packet flow, the network device may send the burst parameter of the first packet flow to a device having a display function, so that the display device displays the burst parameter of the first packet flow, to visualize the burst parameter of the first packet flow. For example, the network device outputs the burst parameter shown in Table 7 or Table 8 to the display device.

In this embodiment of this application, the network device includes a forwarding chip (forwarding plane) and a control chip (control plane). S401, S402, and S4031 may be performed by the forwarding chip, and S4032 may be performed by the control chip. In a possible implementation, after determining the burst parameter distribution of the plurality of burst traffic segments of the first packet flow, the forwarding chip reports the burst parameter distribution to the control chip, so that the control chip performs S4032. Alternatively, the control chip actively obtains the burst parameter distribution of the plurality of burst traffic segments of the first packet flow from the forwarding chip. In addition, because a transmission process of the first packet flow is continuous, the forwarding chip may periodically determine the burst parameter distribution of the plurality of burst traffic segments of the first packet flow. In this way, the forwarding chip may periodically report the burst parameter distribution to the control chip, or the control chip periodically obtains the burst parameter distribution from the forwarding chip. This is not limited in this embodiment of this application. Each time the network device receives one packet of the first packet flow, a timestamp at which the network device receives the packet may be recorded. Specifically, a timer in the forwarding chip records the receiving timestamp. Precision of a report period of the forwarding chip may be less than precision of recording a receiving timestamp by the timer, to avoid timer overturning. In this application, the forwarding chip and the control chip collaboratively determine a burst parameter of a packet flow.

In conclusion, according to the flow characteristic extraction method provided in this embodiment of this application, the network device determines the burst parameter of the burst traffic segment of the received first packet flow, and determines the burst parameter of the first packet flow based on the burst parameter of the burst traffic segment of the first packet flow. The burst traffic segment indicates a burst degree of traffic within one period of time. The burst parameter of the burst traffic segment is a parameter used to describe the burst traffic segment. The burst parameter of the first packet flow is a parameter used to describe at least one burst traffic segment included in the first packet flow. The burst parameter of the first packet flow may represent a flow characteristic of the first packet flow. Therefore, in this application, the flow characteristic of the first packet flow is extracted, that is, a flow characteristic of a packet flow that includes burst traffic is extracted.

In this embodiment of this application, before performing S402 and S403, the network device may first identify the first packet flow, to determine whether the first packet flow is an elephant flow. If the network device determines that the first packet flow is an elephant flow, the network device performs S402 and S403. If the network device determines that the first packet flow is not an elephant flow, the network device may not perform S402 and S403.

For example, the network device determines a rate of the first packet flow based on a plurality of packets of the first packet flow, and determines, based on the rate of the first packet flow, whether the first packet flow is an elephant flow. For example, when the rate of the first packet flow is greater than a specific rate threshold, the network device determines that the first packet flow is an elephant flow. Alternatively, the network device may sort obtained rates of a plurality of packet flows. When the rate of the first packet flow belongs to the first N high rates in the rates of the plurality of packet flows, the network device determines that the first packet flow is an elephant flow. In some embodiments, considering that the network device obtains a large quantity of packet flows, to reduce workload of sorting rates of the packet flows by the network device, before sorting the rates of the packet flows, the network device may further pre-filter the packet flows. Considering that a length of a packet that belongs to an elephant flow is generally long, for example, the network device may pre-filter a packet flow based on a length of a packet, and sort a rate of the packet flow to which the packet belongs only when the length of the packet is greater than a specific length threshold, otherwise, the packet flow is directly determined as a mice flow, to filter out some mice flows and reduce a quantity of packet flows that participate in sorting. In other words, when packet lengths of the plurality of packets of the first packet flow are all greater than or equal to the foregoing length threshold, the network device calculates the rate of the first packet flow based on the plurality of packets of the first packet flow, and sorts rates based on the rate of the first packet flow, to determine whether the first packet flow is an elephant flow.

In the embodiment shown in FIG. 4, an example in which the network device determines the burst parameter of the first packet flow based on the burst parameter distribution of the plurality of burst traffic segments of the first packet flow is used for description. In another embodiment, after determining the burst parameter distribution of the plurality of burst traffic segments, the network device may output the burst parameter distribution of the plurality of burst traffic segments to another device (for example, a control device), so that the control device determines the burst parameter of the first packet flow based on the burst parameter distribution of the plurality of burst traffic segments. Alternatively, the network device may send the burst parameter distribution of the plurality of burst traffic segments to a device having a display function, so that the display device displays the burst parameter distribution of the plurality of burst traffic segments, to visualize the burst parameter distribution.

The network device may directly output the burst parameter distribution of the plurality of burst traffic segments (for example, output at least one of Table 1 to Table 6), or the network device may output the burst parameter distribution of the plurality of burst traffic segments by using a visual graph. The visual graph is, for example, a histogram or a curve chart. This is not limited in this embodiment of this application.

In an example, the flow characteristic extraction method provided in this embodiment of this application further includes S404.

S404: The network device outputs a histogram of the burst parameter distribution of the plurality of burst traffic segments.

Figure 7:
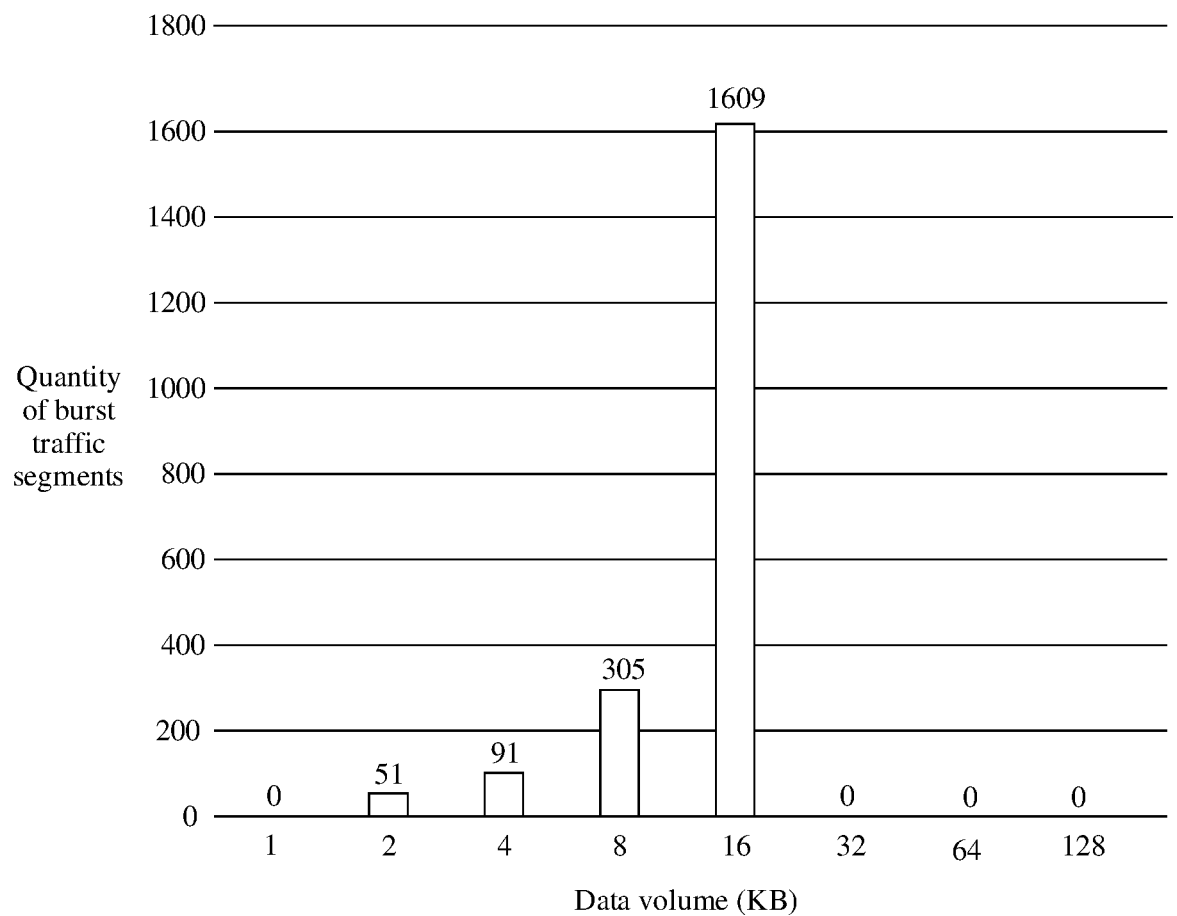
FIG. 7 is an example histogram of data volume distribution according to an embodiment of this application.
Figure 8:
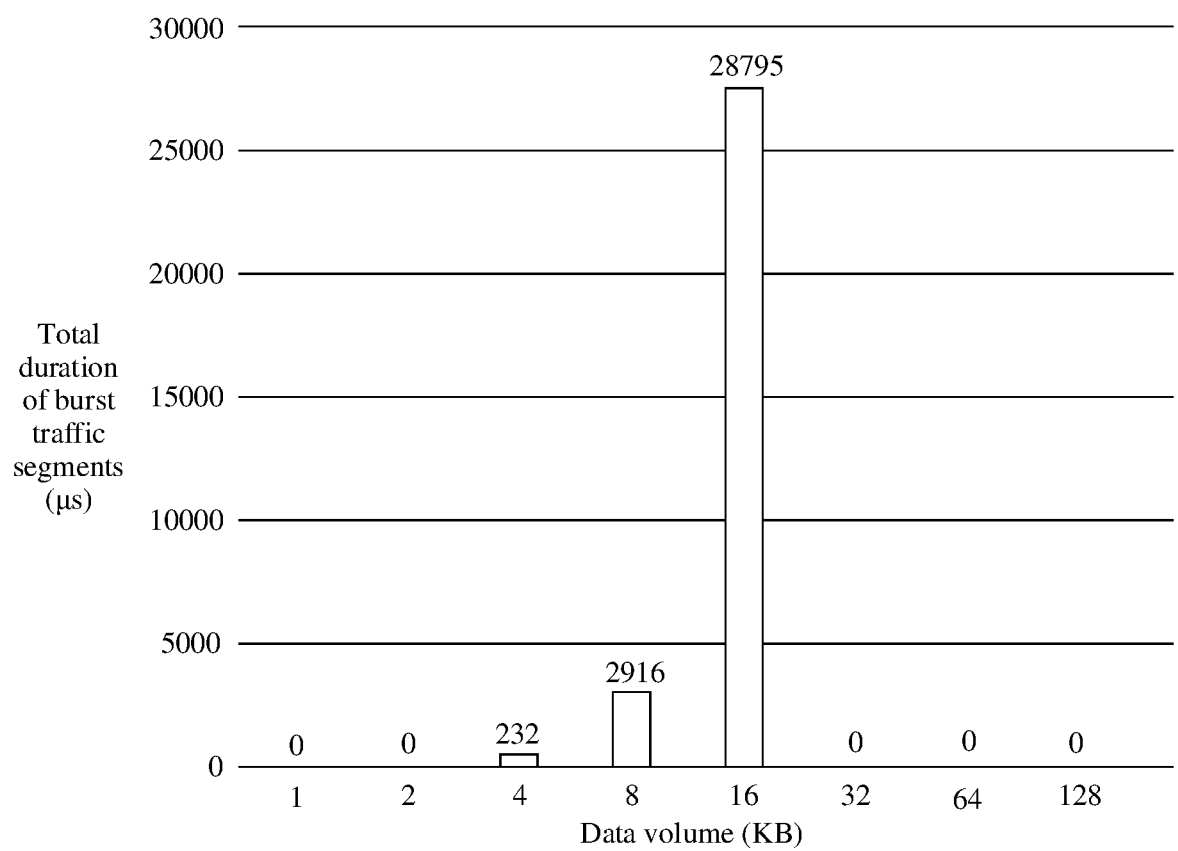
FIG. 8 is an example histogram of duration distribution according to an embodiment of this application.
Figure 9:
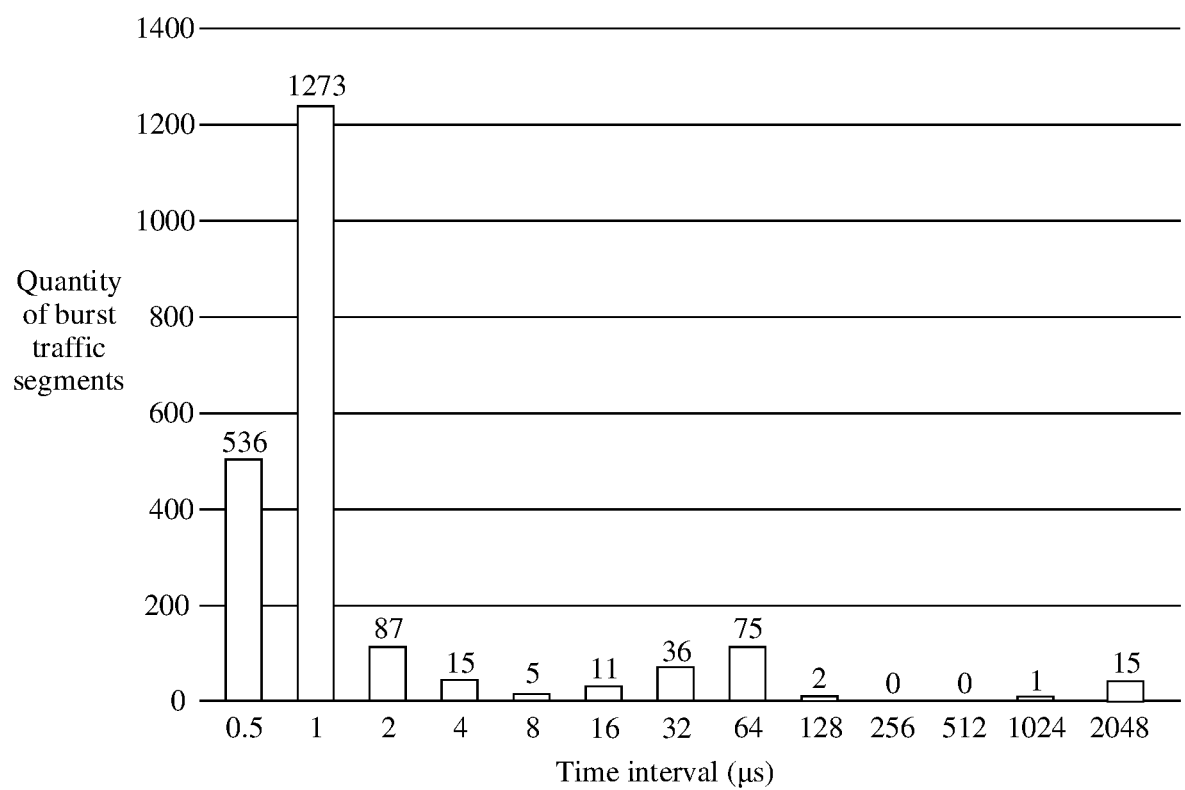
FIG. 9 is an example histogram of time interval distribution according to an embodiment of this application.

For example, the burst parameter distribution of the plurality of burst traffic segments of the first packet flow includes the data volume distribution shown in Table 1, the duration distribution shown in Table 2, and the time interval distribution shown in Table 3. A histogram that is of the data volume distribution and that is output by the network device may be shown in FIG. 7, a histogram that is of the duration distribution and that is output by the network device may be shown in FIG. 8, and a histogram that is of the time interval distribution and that is output by the network device may be shown in FIG. 9. For histograms that are of the burst parameter distribution shown in Table 4 to Table 6 and that are output by the network device, refer to FIG. 7 to FIG. 9.

In this embodiment of this application, a classification unit, a count range, and the like of each histogram may be properly selected, to simplify a process in which the network device outputs the histogram, and reduce resource overheads of the network device.

In this embodiment of this application, that the network device determines the burst parameter of the first packet flow has a broad application prospect. After determining the burst parameter of the first packet flow, the network device may perform some processing related to the first packet flow by applying the burst parameter of the first packet flow. In an example, the network device performs at least one of the following steps S405 to S408 based on the burst parameter of the first packet flow.

S405: A service type of the first packet flow is determined based on the burst parameter of the first packet flow.

The burst parameter of the first packet flow may represent a burst degree of the first packet flow. Generally, packet flows of different types of services have different burst degrees. For example, packet flows of real-time interactive services, such as VR, video conferencing, voice, power differential, and gaming, have small and regular bursts. Packet flows of non-real-time interactive services, such as on-demand video and downloading, have large bursts, and the bursts are intermittent and unstable. Therefore, the network device may determine the service type of the first packet flow based on this and with reference to the burst parameter of the first packet flow, for example, determine whether the first packet flow belongs to a real-time interactive service or a non-real-time interactive service.

For example, the network device determines the service type of the first packet flow based on the burst parameter of the first packet flow and the following conditions. In a specific embodiment, the following conditions may be configured in a decision model (or referred to as a decision tree). The network device may input the burst parameter of the first packet flow into the decision model, so that the decision model determines the service type of the first packet flow based on the burst parameter of the first packet flow. The conditions include the following.

(1) Whether a quantity of burst levels of the first packet flow is greater than a preset quantity of levels.

(2) Whether a data volume of an aggregated burst traffic segment of each burst level of the first packet flow is greater than a corresponding data volume threshold. Each burst level may correspond to at least one data volume threshold.

(3) Whether a rate of an aggregated burst traffic segment of each burst level of the first packet flow is greater than a corresponding rate threshold. Each burst level may correspond to at least one rate threshold.

(4) Whether a time interval between adjacent aggregated burst traffic segments of each burst level of the first packet flow is greater than a corresponding level interval threshold. Each burst level may correspond to at least one level interval threshold.

S406: An SLA requirement level of the first packet flow is determined based on the burst parameter of the first packet flow.

The network device may determine the service type of the first packet flow based on the burst parameter of the first packet flow, and determine the SLA requirement level of the first packet flow based on the service type of the first packet flow.

For a process in which the network device determines the service type of the first packet flow, refer to S405. Optionally, the service type of the first packet flow includes a real-time interactive service or a non-real-time interactive service. If the service type of the first packet flow is a real-time interactive service, the network device determines that the first packet flow needs to have a high priority (that is, an SLA requirement level), and the network device allocates a high priority to the first packet flow. If the service type of the first packet flow is a non-real-time interactive service, the network device determines that the first packet flow may have a low priority, and the network device allocates a low priority to the first packet flow.

S407: An arrival model of the first packet flow is determined based on the burst parameter of the first packet flow.

The network device may determine an initial arrival model, and adjust a model parameter of the initial arrival model based on the burst parameter of the first packet flow, to optimize the initial arrival model, to obtain the arrival model of the first packet flow. The arrival model of the first packet flow may be burst probability distribution of the first packet flow, and is used to describe a probability that a burst occurs in the first packet flow.

S408: Attack traffic is detected based on the burst parameter of the first packet flow.

The burst parameter of the first packet flow is used to represent the flow characteristic of the first packet flow. Generally, flow characteristics of packet flows of different service types are different. Flow characteristics of packet flows of a specified service type show a regularity.

In an optional embodiment, the network device may determine the service type of the first packet flow, and the network device determines, based on the burst parameter of the first packet flow, whether the flow characteristic of the first packet flow complies with a flow characteristic of a packet flow of the service type. If the flow characteristic of the first packet flow complies with the flow characteristic of the packet flow of the service type, the network device determines that the traffic of the first packet flow is not attack traffic. If the flow characteristic of the first packet flow does not comply with the flow characteristic of the packet flow of the service type, the network device determines that the traffic of the first packet flow is attack traffic.

Optionally, the network device inputs the burst parameter of the first packet flow into an attack detection model, so that the attack detection model detects, based on the burst parameter of the first packet flow, whether the traffic of the first packet flow is attack traffic.

The foregoing describes the flow characteristic extraction method provided in embodiments of this application. The following describes apparatus embodiments of this application. An apparatus in this application may be configured to perform the flow characteristic extraction method in this application. For details not disclosed in apparatus embodiments of this application, refer to method embodiments of this application.

Figure 10:
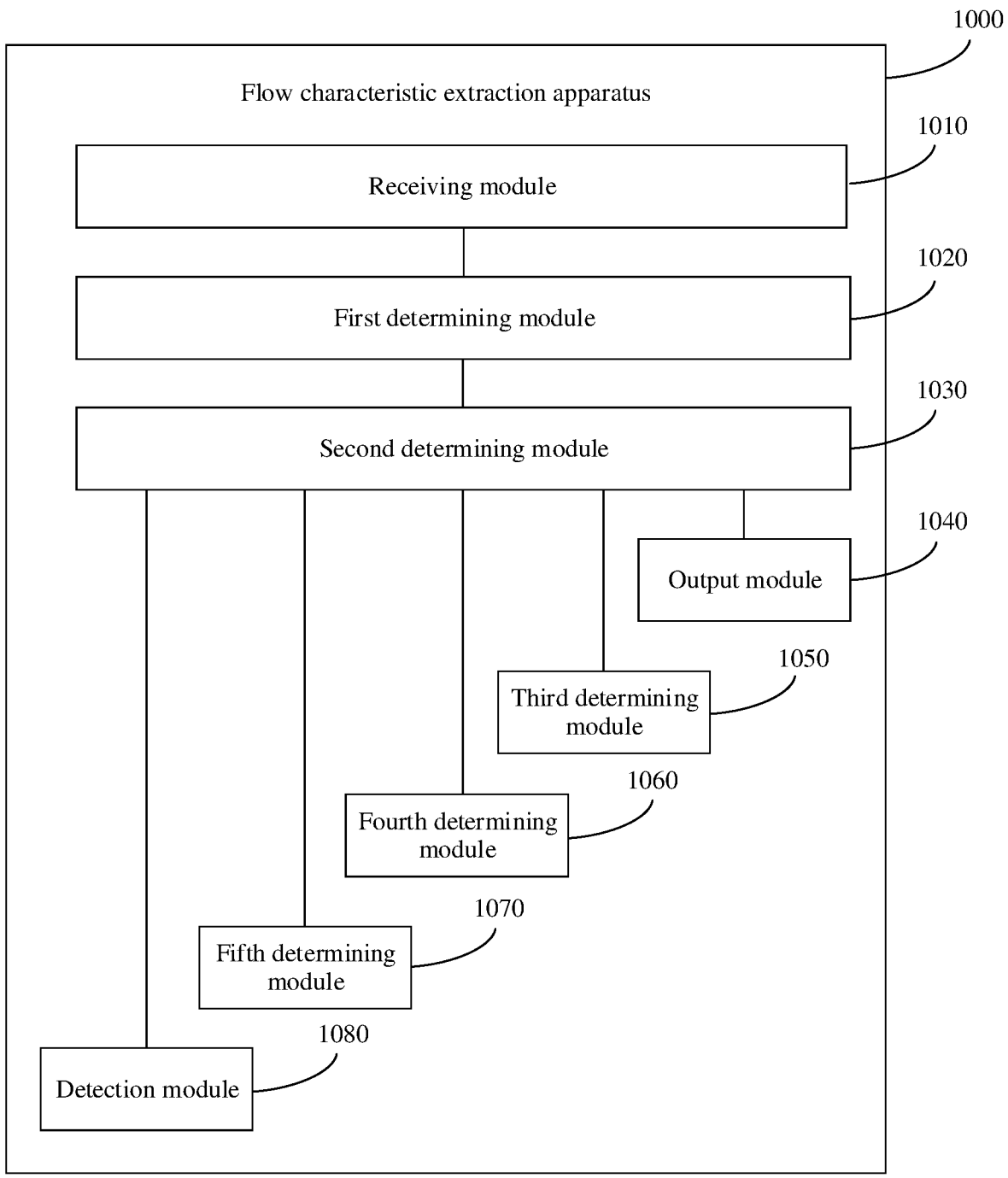
FIG. 10 is an example schematic diagram of a structure of a flow characteristic extraction apparatus according to an embodiment of this application.

FIG. 10 is a schematic diagram of a structure of a flow characteristic extraction apparatus 1000 according to an embodiment of this application. The flow characteristic extraction apparatus 1000 is used in a network device. For example, the flow characteristic extraction apparatus 1000 is a network device or a functional component in the network device. As shown in FIG. 10, the flow characteristic extraction apparatus 1000 includes but is not limited to a receiving module 1010, a first determining module 1020, and a second determining module 1030.

The receiving module 1010 is configured to receive a first packet flow. The first packet flow is an elephant flow. For function implementation of the receiving module 1010, refer to related descriptions in S401.

The first determining module 1020 is configured to determine a burst parameter of a burst traffic segment of the first packet flow. The burst traffic segment indicates a burst degree of traffic within one period of time. The burst parameter of the burst traffic segment is a parameter used to describe the burst traffic segment. For function implementation of the first determining module 1020, refer to related descriptions in S402.

The second determining module 1030 is configured to determine a burst parameter of the first packet flow based on the burst parameter of the burst traffic segment of the first packet flow. The burst parameter of the first packet flow is a parameter used to describe at least one burst traffic segment included in the first packet flow. For function implementation of the second determining module 1030, refer to related descriptions in S403.

Optionally, the first packet flow includes aggregated burst traffic segments of n burst levels. The aggregated burst traffic segments are determined based on burst traffic segments of the first packet flow, and n is a positive integer.

The burst parameter of the first packet flow includes at least one of the following: a quantity of burst levels of the first packet flow, and a burst parameter of an aggregated burst traffic segment of each burst level of the first packet flow. The burst parameter of the aggregated burst traffic segment is a parameter used to describe the aggregated burst traffic segment.

Optionally, the burst parameter of the aggregated burst traffic segment of each burst level includes at least one of the following: a data volume of the aggregated burst traffic segment of the burst level, duration of the aggregated burst traffic segment of the burst level, a rate of the aggregated burst traffic segment of the burst level, and a time interval between adjacent aggregated burst traffic segments of the burst level.

Optionally, a burst parameter of each burst traffic segment includes at least one of the following: a data volume of the burst traffic segment, duration of the burst traffic segment, and a time interval between the burst traffic segment and a burst traffic segment adjacent to the burst traffic segment.

Optionally, the first determining module 1020 is configured to: determine at least one burst traffic segment of the first packet flow based on a packet in the first packet flow, and determine the burst parameter of the burst traffic segment based on a packet in the burst traffic segment.

Optionally, the first packet flow includes a plurality of burst traffic segments, and the second determining module 1030 is configured to: determine burst parameter distribution of the plurality of burst traffic segments based on burst parameters of the plurality of burst traffic segments, and determine the burst parameter of the first packet flow based on the burst parameter distribution.

Optionally, the burst parameter of the burst traffic segment includes at least one of a data volume of the burst traffic segment, duration of the burst traffic segment, and a time interval corresponding to the burst traffic segment. The time interval corresponding to the burst traffic segment is a time interval between the burst traffic segment and a burst traffic segment adjacent to the burst traffic segment. The burst parameter distribution includes at least one of data volume distribution, duration distribution, and time interval distribution. The data volume distribution includes a plurality of data volumes and a quantity of burst traffic segments of each of the plurality of data volumes. The duration distribution includes the plurality of data volumes and total duration of burst traffic segments of each of the plurality of data volumes. The time interval distribution includes a plurality of time intervals and a quantity of burst traffic segments corresponding to each of the plurality of time intervals. The plurality of data volumes are determined based on data volumes of the plurality of burst traffic segments. The plurality of time intervals are determined based on time intervals corresponding to the plurality of burst traffic segments.

Optionally, the first packet flow includes the aggregated burst traffic segments of n burst levels, where n is an integer greater than 1. In ascending order of burst levels, data volumes of the aggregated burst traffic segments of n burst levels increase sequentially, and time intervals between adjacent aggregated burst traffic segments of n burst levels increase sequentially.

That the burst parameter of the first packet flow is determined based on the burst parameter distribution includes at least one of the following:

determining a first data volume in the data volume distribution as a data volume of an aggregated burst traffic segment of the $1^{st}$ burst level, where the $1^{st}$ burst level is a lowest burst level in the n burst levels, and the first data volume is a data volume corresponding to a largest quantity of burst traffic segments in the data volume distribution;

determining n interval levels based on the time interval distribution, where the interval level includes at least one time interval, quantities of burst traffic segments corresponding to time intervals in the interval level increase sequentially from a boundary of the interval level to a center of the interval level, and time intervals in the n interval levels increase sequentially; and determining a time interval between adjacent aggregated burst traffic segments of a $k^{th}$ burst level based on a time interval in a $k^{th}$ interval level of the n interval levels, where $1 \leq k \leq n$, and k is an integer;

determining a data volume of an aggregate burst traffic segment of an $i^{th}$ burst level based on a total quantity of burst traffic segments in the time interval distribution, a total quantity of burst traffic segments corresponding to a time interval of an $i^{th}$ interval level of the n interval levels, and the data volume of the aggregate burst traffic segment of the $1^{st}$ burst level, where $1 < i \leq n$, and i is an integer;

determining duration of an aggregated burst traffic segment of the $k^{th}$ burst level based on total duration corresponding to a data volume of the aggregated burst traffic segment of the $k^{th}$ burst level in the duration distribution and a quantity of burst traffic segments corresponding to the data volume of the aggregated burst traffic segment of the $k^{th}$ burst level in the data volume distribution; and determining a rate of the aggregated burst traffic segment of the $k^{th}$ burst level based on the data volume of the aggregated burst traffic segment of the $k^{th}$ burst level and the duration of the aggregated burst traffic segment of the $k^{th}$ burst level.

Optionally, the flow characteristic extraction apparatus 1000 further includes an output module 1040, configured to output a histogram of the burst parameter distribution. For an implementation process of the output module 1040, refer to related descriptions in S404.

Optionally, the flow characteristic extraction apparatus 1000 further includes a third determining module 1050, configured to determine a service type of the first packet flow based on the burst parameter of the first packet flow. For an implementation process of the third determining module 1050, refer to related descriptions in S405.

Optionally, the flow characteristic extraction apparatus 1000 further includes a fourth determining module 1060, configured to determine an SLA requirement level of the first packet flow based on the burst parameter of the first packet flow. For an implementation process of the fourth determining module 1060, refer to related descriptions in S406.

Optionally, the flow characteristic extraction apparatus 1000 further includes a fifth determining module 1070, configured to determine an arrival model of the first packet flow based on the burst parameter of the first packet flow, where the arrival model is represented by at least one of a transmission delay and a packet loss rate of the first packet flow. For an implementation process of the fifth determining module 1070, refer to related descriptions in S407.

Optionally, the flow characteristic extraction apparatus 1000 further includes a detection module 1080, configured to detect attack traffic based on the burst parameter of the first packet flow. For an implementation process of the detection module 1080, refer to related descriptions in S408.

In conclusion, according to the flow characteristic extraction apparatus provided in this embodiment of this application, a network device determines a burst parameter of a burst traffic segment of a received first packet flow, and determines a burst parameter of the first packet flow based on the burst parameter of the burst traffic segment of the first packet flow. The first packet flow is an elephant flow. The burst traffic segment indicates a burst degree of traffic within one period of time. The burst parameter of the burst traffic segment is a parameter used to describe the burst traffic segment. The burst parameter of the first packet flow is a parameter used to describe at least one burst traffic segment included in the first packet flow. The burst parameter of the first packet flow may represent a flow characteristic of the first packet flow. Therefore, in this application, the flow characteristic of the first packet flow is extracted, that is, a flow characteristic of a packet flow that includes burst traffic is extracted.

In this embodiment of this application, that the network device determines the burst parameter of the first packet flow has a broad application prospect. For example, the network device may determine a service type of the first packet flow, determine an SLA requirement level of the first packet flow, determine an arrival model of the first packet flow, detect attack traffic, and the like based on the burst parameter of the first packet flow. In addition, after determining the SLA requirement level of the first packet flow, the network device may further forward the first packet flow based on the SLA requirement level of the first packet flow, so that the network device may forward different packet flows based on SLA requirement levels of different packet flows. This helps ensure transmission quality of a high-value service. After determining the arrival model of the first packet flow, the network device may further quantitatively evaluate, based on the arrival model of the first packet flow, impact of the first packet flow on a buffer of the network device and network stability.

It should be understood that the flow characteristic extraction apparatus provided in this embodiment of this application may alternatively be implemented by using an application-specific integrated circuit (ASIC) or a programmable logic device (PLD). The PLD may be a complex programmable logic device (CPLD), a field-programmable gate array (FPGA), a generic array logic (GAL), or any combination thereof. Alternatively, the flow characteristic extraction method provided in the foregoing method embodiment may be implemented by using software. When the flow characteristic extraction method provided in the foregoing method embodiment is implemented by using software, each module in the flow characteristic extraction apparatus may alternatively be a software module.

Figure 11:
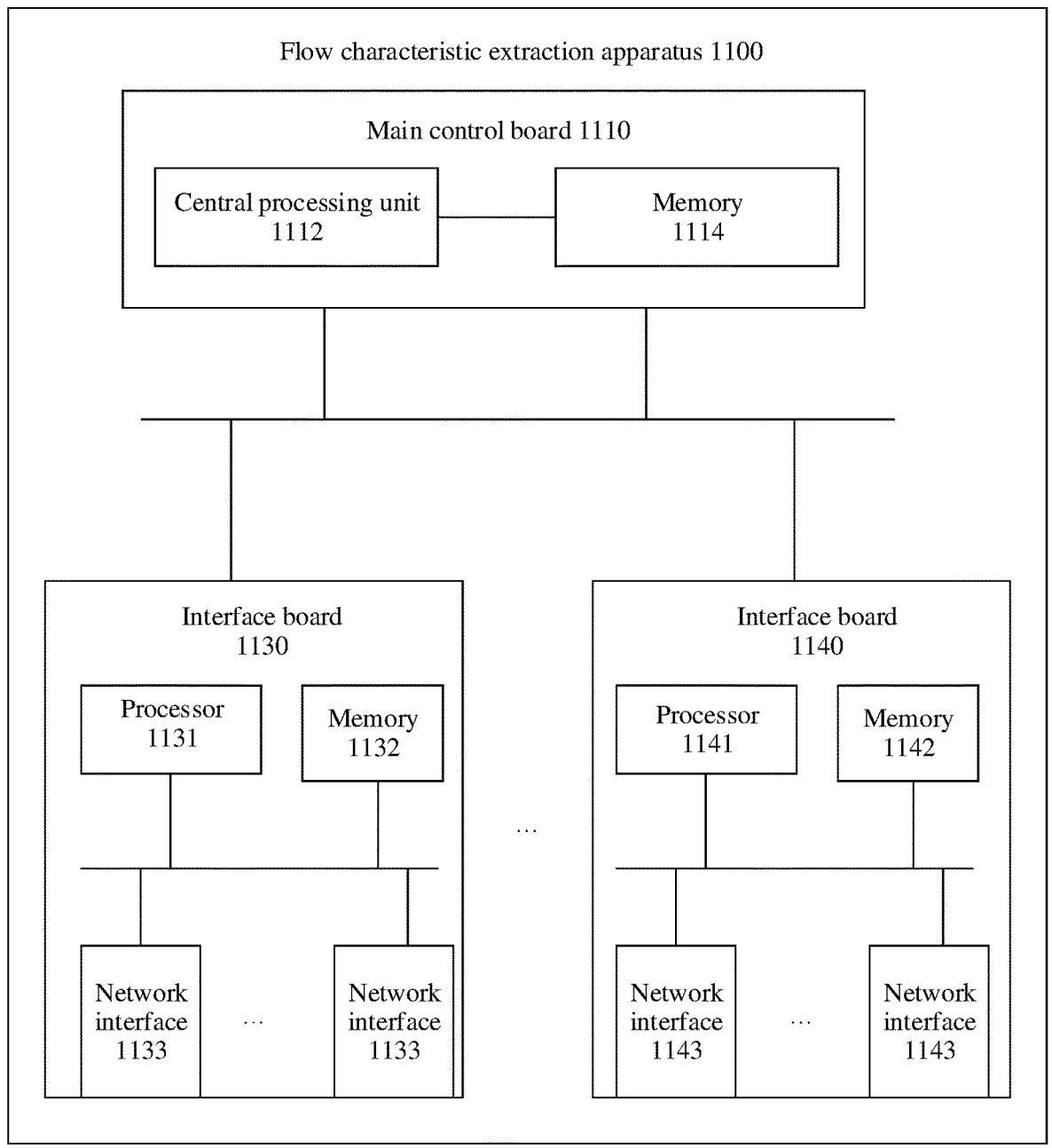
FIG. 11 is an example schematic diagram of a structure of another flow characteristic extraction apparatus according to an embodiment of this application.

FIG. 11 is a schematic diagram of a structure of another flow characteristic extraction apparatus 1100 according to an embodiment of this application. The flow characteristic extraction apparatus 1100 may be the network device in the foregoing embodiment or a functional component in the network device. As shown in FIG. 11, the flow characteristic extraction apparatus 1100 includes a main control board 1110, an interface board 1130, and an interface board 1140. When there are a plurality of interface boards, a switching board (not shown in FIG. 11) may be included. The switching board is configured to complete data exchange between interface boards (the interface board is also referred to as a line card or a service board). In some embodiments, the main control board may also be referred to as a control chip, and the interface board may also be referred to as a forwarding chip.

The main control board 1110 is configured to complete functions such as system management, device maintenance, and protocol processing. The interface board 1130 and the interface board 1140 are configured to provide various service interfaces (for example, a POS interface, a GE interface, and an ATM interface) and forward packets. The main control board 1110 mainly includes three types of function units: a system management and control unit, a system clock unit, and a system maintenance unit. The main control board 1110, the interface board 1130, and the interface board 1140 are connected to a system backboard through a system bus to implement interworking. The interface board 1130 includes one or more processors 1131. The processor 1131 is configured to control and manage the interface board 1130 and communicate with a central processing unit 1112 on the main control board 1110. A memory 1132 on the interface board 1130 is configured to store information such as a routing and forwarding table. The processor 1131 forwards a packet based on the routing and forwarding table. As shown in FIG. 11, the main control board 1110 may include a memory 1114. The memory 1114 on the main control board 1110 may also be configured to store information such as a routing and forwarding table. This is not limited in this embodiment of this application.

The interface board 1130 includes one or more network interfaces 1133 configured to receive and send a packet. The processor 1131 processes the packet received by the network interface 1133.

It may be understood that, as shown in FIG. 11, this embodiment includes a plurality of interface boards, and uses a distributed forwarding mechanism. In this mechanism, operations on the interface board 1140 are basically similar to operations on the interface board 1130. In addition, it may be understood that the processor 1131 on the interface board 1130 and/or a processor 1141 on the interface board 1140 in FIG. 11 may be dedicated hardware or a chip, for example, a network processor or an application-specific integrated circuit, to implement the foregoing functions. This implementation is generally referred to as a manner of using dedicated hardware or a chip for processing on a forwarding plane. In another implementation, the processor 1131 on the interface board 1130 and/or the processor 1141 on the interface board 1140 may alternatively use a general-purpose processor, for example, a general-purpose central processing unit (CPU), to implement the functions described above.

In addition, it should be noted that there may be one or more main control boards, and when there are a plurality of main control boards, the main control boards may include a primary main control board and a secondary main control board. There may be one or more interface boards, and a network device having a stronger data processing capability provides more interface boards. If there are a plurality of interface boards, the plurality of interface boards can communicate with each other by using one or more switching boards, and the plurality of interface boards can jointly implement load balancing and redundancy backup. In a centralized forwarding architecture, the network device may not need the switching board, and the interface board provides a function of processing service data of an entire system. In a distributed forwarding architecture, the network device includes a plurality of interface boards. Data exchange between the plurality of interface boards may be implemented by using a switching board, and the plurality of interface boards can provide a large-capacity data exchange and processing capability. Therefore, a data access and processing capability of the network device in the distributed architecture is better than that of the device in the centralized architecture. Which architecture is specifically used depends on a specific networking deployment scenario.

In an optional embodiment, the memory 1132 may be a read-only memory (ROM), another type of static storage device that can store static information and instructions, a random access memory (RAM), or another type of dynamic storage device that can store information and instructions, or may be an electrically erasable programmable read-only memory (EEPROM), a compact disc read-only memory (CD-ROM) or another compact disc storage, an optical disc storage (including a compact optical disc, a laser disc, an optical disc, a digital versatile disc, a Blu-ray disc, and the like), a magnetic disk or another magnetic storage device, or any other medium that can be used to carry or store expected program code in a form of an instruction or a data structure and that can be accessed by a computer. However, the memory is not limited thereto. The memory 1132 may exist independently, and is connected to the processor 1131 through a communication bus. The memory 1132 may alternatively be integrated with the processor 1131.

The memory 1132 is configured to store program code, and the processor 1131 controls execution of the program code, to perform some or all of the steps of the flow characteristic extraction method provided in the foregoing embodiments. The processor 1131 is configured to execute the program code stored in the memory 1132. The program code may include one or more software modules. The one or more software modules may be the functional modules provided in the embodiment in FIG. 10. The memory 1114 may also be configured to store program code, and the central processing unit 1112 controls execution of the program code, to perform some or all of the steps of the flow characteristic extraction method provided in the foregoing embodiments.

In an optional embodiment, the network interface 1133 may be an apparatus that uses any transceiver, and is configured to communicate with another device or a communication network, for example, the Ethernet, a radio access network (RAN), and a wireless local area network (WLAN).

Figure 12:
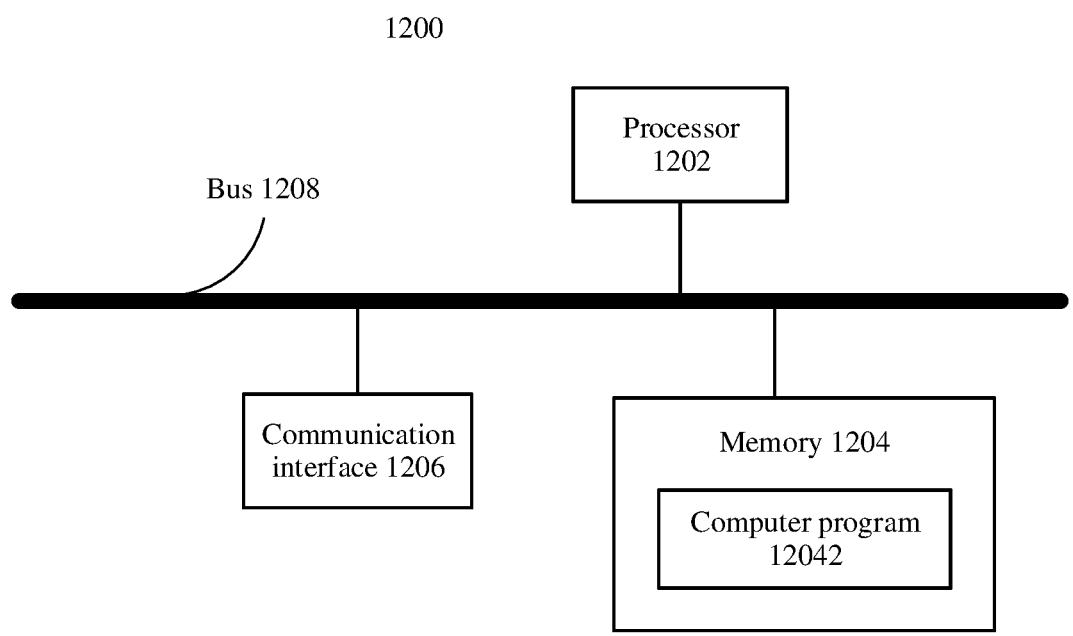
FIG. 12 is an example schematic diagram of a structure of still another flow characteristic extraction apparatus according to an embodiment of this application.

FIG. 12 is a schematic diagram of a structure of still another flow characteristic extraction apparatus 1200 according to an embodiment of this application. The flow characteristic extraction apparatus 1200 may be the network device in any one of the foregoing embodiments or a functional component in the network device. As shown in FIG. 12, the flow characteristic extraction apparatus 1200 includes a processor 1202, a memory 1204, a communication interface 1206, and a bus 1208. The processor 1202, the memory 1204, and the communication interface 1206 are communicatively connected to each other through the bus 1208. The manner of connection between the processor 1202, the memory 1204, and the communication interface 1206 shown in FIG. 12 is merely an example. In an implementation process, the processor 1202, the memory 1204, and the communication interface 1206 may be communicatively connected to each other in another connection manner other than the bus 1208.

The memory 1204 may be configured to store a computer program 12042. The computer program 12042 may include instructions and data. In this embodiment of this application, the memory 1204 may be various types of storage media, for example, a RAM, a ROM, a non-volatile RAM (NVRAM), a programmable ROM (PROM), an erasable PROM (EPROM), an electrically erasable PROM (EEPROM), a flash memory, an optical memory, and a register. In addition, the memory 1204 may include a hard disk and/or a memory.

The processor 1202 may be a general-purpose processor. The general-purpose processor may be a processor that reads and executes a computer program (for example, the computer program 12042) stored in a memory (for example, the memory 1204) to perform a specific step and/or operation. In a process of performing the foregoing steps and/or operations, the general-purpose processor may use data stored in the memory (for example, the memory 1204). For example, the stored computer program may be executed to implement related functions of the first determining module 1020, the second determining module 1030, the third determining module 1050, the fourth determining module 1060, the fifth determining module 1070, and the detection module 1080. The general-purpose processor may be, for example, but not limited to, a CPU. In addition, the processor 1202 may alternatively be a dedicated processor. The dedicated processor may be a processor specially designed to perform a specific step and/or operation. The dedicated processor may be, for example, but not limited to, an ASIC and an FPGA. In addition, the processor 1202 may alternatively be a combination of a plurality of processors, for example, a multi-core processor. The processor 1202 may include at least one circuit, to perform all or some of the steps of the flow characteristic extraction method provided in the foregoing embodiments.

The communication interface 1206 may include an input/output (I/O) interface, a physical interface, a logical interface, and the like that are configured to implement interconnection between components in the flow characteristic extraction apparatus 1200, and an interface that is configured to implement interconnection between the flow characteristic extraction apparatus 1200 and another device (for example, a network device). The physical interface may be a gigabit Ethernet (GE) interface, and may be configured to implement the interconnection between the flow characteristic extraction apparatus 1200 and the another device. The logical interface is an internal interface of the flow characteristic extraction apparatus 1200, and may be configured to implement the interconnection between components in the flow characteristic extraction apparatus 1200. It is easy to understand that the communication interface 1206 may be used by the flow characteristic extraction apparatus 1200 to communicate with another device. For example, the communication interface 1206 is configured to send and receive a packet between the flow characteristic extraction apparatus 1200 and the another device. The communication interface 1206 may implement related functions of the foregoing receiving module 1010 and output module 1040.

The bus 1208 may be any type of communication bus, for example, a system bus, used to implement interconnection between the processor 1202, the memory 1204, and the communication interface 1206.

The foregoing components may be separately disposed on chips that are independent of each other, or at least some or all of the components may be disposed on a same chip. Whether all the components are separately disposed on different chips or integrated and disposed on one or more chips usually depends on a requirement of a product design. This embodiment of this application imposes no limitation on specific implementations of the foregoing components.

The flow characteristic extraction apparatus 1200 shown in FIG. 12 is merely an example. In an implementation process, the flow characteristic extraction apparatus 1200 may further include other components, which are not listed one by one in this specification. The flow characteristic extraction apparatus 1200 shown in FIG. 12 extracts a flow characteristic of a packet flow by performing all or some of the steps of the flow characteristic extraction method provided in the foregoing embodiments.

An embodiment of this application provides a computer-readable storage medium. The computer-readable storage medium stores a computer program. When the computer program is executed (for example, executed by a network device or one or more processors), all or some of the steps of the method provided in the foregoing method embodiments are implemented.

An embodiment of this application provides a computer program product. The computer program product includes a program or code. When the program or the code is executed (for example, executed by a network device or one or more processors), all or some of the steps of the method provided in the foregoing method embodiments are implemented.

An embodiment of this application provides a chip. The chip includes a programmable logic circuit and/or program instructions. When the chip runs, the chip is configured to implement all or some of the steps of the method provided in the foregoing method embodiments.

All or some of the foregoing embodiments may be implemented by using software, hardware, firmware, or any combination thereof. When software is used to implement embodiments, all or some of embodiments may be implemented in a form of a computer program product. The computer program product includes one or more computer instructions. When computer program instructions are loaded and executed on a computer, the procedures or functions according to embodiments of this application are all or partially generated. The computer may be a general-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage apparatus, such as a server or a data center, integrating one or more usable media. The usable medium may be a magnetic medium (for example, a floppy disk, a hard disk, or a magnetic tape), an optical medium, a semiconductor medium (for example, a solid-state drive), or the like.

It should be understood that, in this application, "at least one" means one or more, and "a plurality of" means two or more. In addition, for ease of clear description, in this application, terms such as "first", "second", and "third" are used to distinguish same items or similar items having basically same functions. A person skilled in the art may understand that the terms such as "first", "second", and "third" do not limit a quantity and an execution sequence.

Different types of embodiments such as the method embodiments and the apparatus embodiments provided in embodiments of this application may be mutually referred to. This is not limited in embodiments of this application. A sequence of the operations of the method embodiments provided in embodiments of this application can be properly adjusted, and operations can be correspondingly added or deleted based on a situation. Any modified method that can be figured out by a person skilled in the art without departing from a technical scope disclosed in this application shall fall within the protection scope of this application.

In the corresponding embodiments provided in this application, it should be understood that the disclosed apparatus and the like may be implemented in other composition manners. For example, the foregoing apparatus embodiments are merely examples. For example, division into the units is merely logical function division. During actual implementation, there may be another division manner. For example, a plurality of units or components may be combined or integrated into another system, or some features may be omitted or not performed. In addition, the displayed or discussed mutual couplings or direct couplings or communication connections may be implemented through some interfaces. The indirect couplings or communication connections between the apparatuses or units may be implemented in electronic or other forms.

The units described as separate parts may or may not be physically separate, and parts described as units may or may not be physical units, may be located in one position, or may be distributed on a plurality of network devices (for example, terminal devices). Some or all of the units may be selected based on actual requirements to achieve the objectives of the solutions of embodiments.

The foregoing descriptions are merely specific implementations of this application, but are not intended to limit the protection scope of this application. Any equivalent modification or replacement readily figured out by a person skilled in the art within the technical scope disclosed in this application shall fall within the protection scope of this application. Therefore, the protection scope of this application shall be subject to the protection scope of the claims.

What is claimed is:

1. A flow characteristic extraction method, comprising:
receiving a first packet flow, wherein t
he first packet flow is an elephant flow;
determining a burst parameter of a burst traffic segment of the first packet flow, wherein
the burst traffic segment indicates a burst degree of traffic within a first period of time, and
the burst parameter, of the burst traffic segment, describes the burst traffic segment; and
determining a burst parameter of the first packet flow based on the burst parameter of the burst traffic segment of the first packet, flow, wherein.
the burst parameter, of the first packet flow, describes at least one burst traffic segment comprised in the first packet flow.

2. The method according to claim 1, wherein
the first packet flow comprises one or more aggregated burst traffic segments of n burst levels,
the one or more aggregated burst traffic segments are determined based on the burst, traffic segment, of the first packet flow, and
n is a positive integer; and the burst parameter of the first packet flow comprises at least one of:
  a quantity of burst levels of the first packet flow; or
  a burst parameter of an aggregated burst traffic segment of each burst level of the first packet flow, wherein the burst parameter, of the aggregated burst traffic segment, describes the aggregated burst traffic segment.

3. The method according to claim 2, wherein.
the burst parameter of the aggregated burst traffic segment of the-each burst level comprises at least one of the following:
  a data volume of the aggregated burst traffic segment of each burst level;
  duration of the aggregated burst traffic segment of each burst level;
  a rate of the aggregated burst traffic segment, of each burst level; and
  a time interval between adjacent aggregated burst traffic segments of each burst level.

4. The method according to claim 1, wherein
the burst parameter of the burst traffic segment comprises at least one of:
  a data volume of the burst traffic segment;
  duration of the burst traffic segment; and
  a time interval between the burst traffic segment and a burst traffic segment, adjacent to the burst traffic segment.

5. The method according to claim 1, wherein determining the burst parameter of the burst traffic segment of the first packet flow comprises:
  determining the burst traffic segment of the first packet flow based on a packet in the first packet flow; and
  determining the burst parameter of the burst traffic segment based on a packet in the burst traffic segment.

6. The method according to claim 1, wherein
the first packet flow comprises a plurality of burst traffic segments, and
determining the burst parameter of the first packet flow based on the burst parameter of the burst traffic segment of the first packet flow comprises:
  determining burst parameter distribution of the plurality of burst traffic segments based on burst parameters of the plurality of burst traffic segments; and
  determining the burst parameter of the first packet flow based on the burst parameter distribution.

7. The method according to claim 6, wherein
the burst parameter of the burst traffic segment comprises at least one of:
  a data volume of the burst traffic segment,
  a duration of the burst traffic segment, and
  a time interval corresponding to the burst traffic segment, wherein
the time interval, corresponding to the burst, traffic segment, is between the burst traffic segment and a burst traffic segment adjacent to the burst traffic segment; and
the burst parameter distribution comprises at least one of:
  data volume distribution,
  duration distribution, and
  time interval distribution, wherein
the data volume distribution comprises a plurality of data volumes and a quantity of burst traffic segments of each of the plurality of data volumes,
the duration distribution comprises the plurality of data volumes and total duration of burst traffic segments of each of the plurality of data volumes,
the time interval distribution comprises a plurality of time intervals and a quantity of burst traffic segments corresponding to each of the plurality of time intervals,
the plurality of data volumes are determined based on data volumes of the plurality of burst traffic segments, and
the plurality of time intervals are determined based on time intervals corresponding to the plurality of burst traffic segments.

8. The method according to claim 7, wherein
the first packet flow comprises aggregated burst traffic segments of n burst levels, wherein n is an integer greater than 1,
in ascending order of burst levels, data volumes of the aggregated burst traffic segments of n burst levels increase sequentially, and time intervals between adjacent aggregated burst traffic segments of the n burst levels increase sequentially; and
determining the burst parameter of the first packet flow based on the burst, parameter distribution comprises at least one of:
  determining a first data volume, in the data volume distribution, as an aggregated burst traffic segment of the $1^{st}$ burst level, wherein the $1^{st}$ burst level is a lowest burst level in the n burst levels, and the first data volume corresponds to a largest quantity of burst traffic segments in the data volume distribution;
  determining n interval levels based on the time interval distribution, wherein an interval level comprises at least one time interval, quantities of burst traffic segments corresponding to time intervals in the interval level increase sequentially from a boundary of the interval level to a center of the interval level, and time intervals in the n interval levels increase sequentially, and determining a time interval between adjacent aggregated burst traffic segments of a $k^{th}$ burst level based on a time interval in a $k^{th}$ interval level of the n interval levels, wherein $1 \leq k \leq n$, and k is an integer;
  determining a data volume of an aggregated burst traffic segment of an $i^{th}$ burst level based on a total quantity of burst traffic segments in the time interval distribution, a total quantity of burst traffic segments corresponding to a time interval of an $i^{th}$ interval level of the n interval levels, and. the data volume of the aggregated burst traffic segment of the $1^{st}$ burst level, wherein $1 < i \leq n$, and i is an integer;
  determining duration of an aggregated burst traffic segment of the $k^{th}$ burst level based on total duration corresponding to a data volume of the aggregated burst traffic segment of the $k^{th}$ burst level in the duration distribution and a quantity of burst traffic segments corresponding to the data volume of the aggregated burst traffic segment of the $k^{th}$ burst level in the data volume distribution; and
  determining a rate of the aggregated burst traffic segment of the $k^{th}$ burst level based on the data volume of the aggregated burst traffic segment of the $k^{th}$ burst level and the duration of the aggregated burst traffic segment of the $k^{th}$ burst level.

9. The method according to claim 6, further comprising: outputting a histogram of the burst parameter distribution.

10. The method according to claim 1, further comprising: determining a service type of the first packet flow based on the burst parameter of the first packet flow.

11. The method according to claim 1, further comprising:
determining a service-level agreement (SLA) requirement level of the first packet flow based on the burst parameter of the first packet flow.

12. The method according to claim 1, further comprising:
determining an arrival model of the first packet flown based on the burst parameter of the first packet flow, wherein
the arrival model is represented by at least one of a transmission delay and a packet loss rate of the first packet flow.

13. The method according to claim 1, further comprising:
detecting attack traffic based on the burst parameter of the first packet flow.

14. flow characteristic extraction apparatus, comprising:
a processor; and
a memory configured to store computer readable instructions that, when executed by the processor, cause the flow characteristic extraction apparatus to:
receive a first packet flow;
determine a burst parameter of a burst traffic segment of the first packet flow, wherein
the burst traffic segment indicates a burst degree of traffic within a first period of time, and
the burst parameter, of the burst traffic segment, describes the burst traffic segment; and
determine a burst parameter of the first packet flow based on the burst parameter of the burst traffic segment of the first packet flow, wherein
the burst parameter, of the first packet flow, describes at least one burst, traffic segment comprised in the first, packet flow.

15. The apparatus according to claim 14, wherein
the first packet flow comprises one or more aggregated burst traffic segments of n burst levels,
the one or more aggregated burst traffic segments are determined based on the burst traffic segment of the first packet flow, and
n is a positive integer; and
the burst parameter of the first packet flow comprises at least one of:
a quantity of burst levels of the first packet flow; and
a burst parameter of an aggregated burst traffic segment of each burst level of the first packet flow, wherein
the burst parameter, of the aggregated burstaffic segment, describes the aggregated burst traffic segment.

16. The apparatus according to claim 15, wherein
the burst parameter of the aggregated burst traffic segment of each burst level comprises at, least, one of:
a data volume of the aggregated burst traffic segment of each burst level;
duration of the aggregated burst traffic segment of each burst level;
a rate of the aggregated burst traffic segment of each burst level; and
a time interval between adjacent aggregated burst traffic segments of each burst level.

17. The apparatus according to claim 14, wherein the burst parameter of the burst traffic segment comprises at least one of:
a data volume of the burst traffic segment;
duration of the burst, traffic segment; and
a time interval between the burst traffic segment and a burst traffic segment adjacent to the burst traffic segment.

18. The apparatus according to claim 14, wherein the apparatus to he configured t apparatus is further caused to:
determine at least one burst traffic segment of the first packet flow based on a packet in the first packet flow; and
determine the burst parameter of the burst traffic segment based on a packet in the at least one burst traffic segment.

19. The apparatus according to claim 14, wherein
the first packet flow comprises a plurality of burst traffic segments, and
the apparatus is further caused to:
determine burst parameter distribution of the plurality of burst traffic segments based on burst parameters of the plurality of burst traffic segments; and
determine the burst parameter of the first packet flow based on the burst parameter distribution, wherein
the burst parameter of the burst traffic segment comprises at least one of:
a data volume of the burst traffic segment,
a duration of the burst traffic segment,. and
a time interval corresponding to the burst traffic segment, wherein
the time interval, corresponding to the burst traffic segment, is between the burst traffic segment and a burst traffic segment adjacent to the burst traffic segment; and
the burst parameter distribution comprises at least one of:
data volume distribution,
duration distribution, and
time interval distrThution, wherein
the data volume distribution comprises a plurality of data volumes and a quantity of burst traffic segments of each of the plurality of data volumes,
the duration distribution comprises the plurality of data volumes and total duration of burst traffic segments of each of the plurality of data volumes,
the time interval distribution comprises a plurality of time intervals and a quantity of burst traffic segments corresponding to each of the plurality of time intervals,
the plurality of data volumes are determined based on data volumes of the plurality of burst traffic segments, and
the plurality of time intervals are determined based on time intervals corresponding to the plurality of burst traffic segments.

20. A non-transitory computer readable storage medium configured to store computer readable instructions that, when executed by a processor of an information processing apparatus, cause the information processing apparatus to provide execution comprising:
receiving a first packet flow;
determining a burst parameter of a burst traffic segment of the first packet flow, wherein the burst traffic segment indicates a burst degree of traffic within a first period of time; and
determining a burst parameter of the first packet flow based on the burst parameter of the burst traffic segment of the first packet flow, wherein
the burst parameter, of the first packet flow, describes at least one burst traffic segment comprised in the first packet flow.

* * * * *